US011539695B2

(12) United States Patent
Rozner et al.

(10) Patent No.: US 11,539,695 B2
(45) Date of Patent: Dec. 27, 2022

(54) SECURE CONTROLLED ACCESS TO PROTECTED RESOURCES

(71) Applicant: Twingate Inc., Redwood City, CA (US)

(72) Inventors: Lior Rozner, Sunnyvale, CA (US); Alexander William Marshall, San Francisco, CA (US); Eran Moshe Kampf, San Mateo, CA (US); Dmitry Adamushka, Antwerp (BE); Dzianis Vashchuk, Menlo Park, CA (US); Eugene Lapidous, Saratoga, CA (US)

(73) Assignee: Twingate, Inc., Redwood City, CA (US)

( * ) Notice: Subject to any disclaimer, the term of this patent is extended or adjusted under 35 U.S.C. 154(b) by 93 days.

(21) Appl. No.: 17/105,357

(22) Filed: Nov. 25, 2020

(65) Prior Publication Data

US 2021/0160237 A1 May 27, 2021

Related U.S. Application Data

(60) Provisional application No. 62/940,379, filed on Nov. 26, 2019.

(51) Int. Cl.
| | |
|---|---|
| H04L 29/06 | (2006.01) |
| H04L 9/32 | (2006.01) |
| H04L 29/08 | (2006.01) |
| H04L 9/40 | (2022.01) |
| H04L 67/568 | (2022.01) |

(52) U.S. Cl.
CPC ........ *H04L 63/0876* (2013.01); *H04L 9/3213* (2013.01); *H04L 9/3247* (2013.01); *H04L 63/0236* (2013.01); *H04L 63/0263* (2013.01); *H04L 63/0272* (2013.01); *H04L 63/0281* (2013.01); *H04L 63/102* (2013.01); *H04L 67/568* (2022.05)

(58) Field of Classification Search
CPC ............... H04L 63/0272; H04L 63/102; H04L 67/2842; H04L 9/3213; H04L 63/0281; H04L 63/0236; H04L 9/3247; H04L 63/0263; H04L 63/0876
See application file for complete search history.

(56) References Cited

U.S. PATENT DOCUMENTS

| | | | |
|---|---|---|---|
| 10,193,878 B2 * | 1/2019 | Venkatanaranappa ....................... H04L 63/0815 |
| 10,356,124 B2 * | 7/2019 | Thubert | .............. H04L 63/1458 |
| 2007/0101414 A1 * | 5/2007 | Wing | ...................... H04L 63/20 726/5 |
| 2016/0205140 A1 * | 7/2016 | Verma | .................... H04L 63/20 726/1 |

(Continued)

*Primary Examiner* — Mohammad A Siddiqi
(74) *Attorney, Agent, or Firm* — David R. Stevens; Stevens Law Group

(57) ABSTRACT

A client node (CN) requests content from an access node (AN). Rule set ACR_CN is provided to CN and AN and ACR_AN is used by AN. A request sent by CN in violation of ACR_CN may be blocked and cause AN to block subsequent requests from CN that would be allowed per ACR_CN. A request blocked according to ACR_AN but not ACR_CN is blocked but subsequent requests may still be allowed according to ACR_CN and ACR_AN. Authenticated distribution of the ACR_CN and ACR_AN may be performed in cooperation with a controller using authenticated tokens (AT).

25 Claims, 12 Drawing Sheets

(56) References Cited

U.S. PATENT DOCUMENTS

2019/0199755 A1\* 6/2019 Larionov .............. H04L 63/105
2020/0127994 A1\* 4/2020 Kukreja ................. G06F 21/31
2021/0165379 A1\* 6/2021 Yang ................. G05B 19/0423

\* cited by examiner

SECURE CONTROLLED ACCESS TO PROTECTED RESOURCES

RELATED APPLICATIONS

This application claims the benefit of U.S. Provisional Application Ser. No. 62/940,379, which is hereby incorporated herein by reference in their entirety for all purposes.

FIELD OF THE INVENTION

The present invention relates generally to systems and methods for implementing proxy connections.

BACKGROUND OF THE INVENTION

Digital business transformation requires systems, services, APIs, data and processes to be accessible through multiple ecosystems anywhere, anytime, from any device over the Internet. This expands the surface area for attackers to target. One of the known ways of controlling access to protected resources is to deploy a perimeter firewall providing highly restricted external access to the network with protected resources, while allowing full access from inside of that network. This model creates excessive trust for inside access that can be abused by attackers from the outside once they penetrate the defenses and reach the inside. For instance, an attacker that has reached the inside through a Virtual Private Network (VPN) may be allowed to pass through the perimeter firewall and may access any protected device inside that network as a trusted user, compromise it, and then instruct compromised device to access other protected devices without additional authorization (attack known as a lateral movement).

Instead of allowing every user inside the trusted network to access any protected resource, Zero Trust Network Access (ZTNA) implementations use secure trust brokers to mediate connections between users and protected resources. A Secure trust broker can be deployed on a server, gateway, or a proxy. For instance, BeyondCorp implementation of ZTNA, developed by Google Corporation, uses an internet-facing access proxy with an access control engine to provide service-level authorization to protected resources on a per-request basis. In this implementation, an attacker or a previously compromised device can't access unauthorized resource even from inside the network containing protected resources.

It would be an advancement in the art to improve ZTNA in a network environment.

SUMMARY OF THE INVENTION

In one aspect of the invention, a system for managing access includes: a first computer connected to a network and configured to control access to a protected resource, the first computer comprising one or more processing devices and one or more memory devices operably coupled to the one or more processing devices. The one or more memory devices may store executable code, that, when executed by the one or more processing devices, causes the one or more processing devices to: obtain a first instance of a first set of rules and a first instance of a second set of rules, each of the first set of rules and the second set of rules containing at least one rule specifying one or more conditions for accessing the protected resource by a second computer; receive a request for the protected resource from the second computer over the network; allow the request to proceed to access the protected resource if allowed according to the first instance of the first set of rules and the first instance of the second set of rules; if the request is not allowed according to the first instance of the first set of rules, stop accepting at least some subsequent requests from the second computer even if the at least some subsequent requests would be allowed according to both of the first instance of the first set of rules and the first instance of the second set of rules; and if the request is allowed according to the first instance of the first set of rules but not allowed according to the first instance of the second set of rules, continue to allow at least some of the subsequent requests from the second computer if the at least some of the subsequent requests are allowed according to both of the first instance of the first set of rules and the first instance of the second set of rules.

In some embodiments, the executable code, when executed by the one or more processing devices, further causes the one or more processing devices to: obtain a second instance of the first set of rules; apply the first instance of the first set of rules to first requests from the second computer, the first requests including the request; apply the second instance of the first set of rules to second requests from a third computer different from the second computer; and if the request from the first computer to the second computer is not allowed according to the first instance of the first rule set, continue to allow at least some subsequent requests from the third computer which are allowed according to the second instance of the first rule set and the first instance of the second rule set while blocking at least some of the subsequent requests from the second computer that are allowed according to the first instance of the first set of rules and the first instance of the second set of rules.

In some embodiments, the executable code, when executed by the one or more processing devices, further causes the one or more processing devices to apply the first instance of the second set of rules to both the first requests from the second computer and the second requests from the third computer.

In some embodiments, the executable code, when executed by the one or more processing devices, further causes the one or more processing devices to obtain the first set of rules from the second computer while obtaining the second set of rules from a fourth computer different from the second computer.

In some embodiments, the executable code, when executed by the one or more processing devices, further causes the one or more processing devices to obtain the first set of rules by obtaining a token containing the first set of rules, the token being cryptographically signed or encrypted by a trusted entity.

In some embodiments, the executable code, when executed by the one or more processing devices, further causes the one or more processing devices to use information in the token including any of a token issue time, a token expiration time, a user identifier, a device identifier and keying material to establish a secure communication channel between the first computer and the second computer.

In some embodiments, the executable code, when executed by the one or more processing devices, further causes the one or more processing devices to stop accepting the at least some subsequent requests from the second computer by stopping a connection between the first computer and the second computer.

In some embodiments, the executable code, when executed by the one or more processing devices, further causes the one or more processing devices to stop accepting the at least some subsequent requests from the second computer by invalidating the first instance of the first set of rules.

In another aspect of the invention, a system for managing access includes a first computer connected to a network and configured to control access to the protected resource, the first computer comprising one or more processing devices and one or more memory devices operably coupled to the one or more processing devices. The one or more memory devices may store executable code, that, when executed by the one or more processing devices, causes the one or more processing devices to: obtain a first set of rules containing at least two rules formulated to determine whether requests from a second computer can be allowed to proceed; receive, from the second computer, a first request for a first protected resource, the first request containing a first identifier of the first requested resource; if the first identifier is not allowed according to the first set of rules, block the first request and stop accepting at least some subsequent requests from the second computer that would be allowed according to the first set of rules; and if the first identifier is allowed according to the first set of rules: obtain a second identifier of the first request, the second identifier being associated with the first identifier; if the second identifier is also allowed according to the first set of rules, allow the first request to proceed; and if the second identifier is not allowed according to the first set of rules, block the first request while continuing to allow the at least some subsequent requests from the second computer that are allowed according to the first set of rules.

In some embodiments, the first identifier is a domain name and the second identifier is an Internet Protocol (IP) address. The executable code, when executed by the one or more processing devices, may further cause the one or more processing devices to obtain the second identifier by resolving the domain name to the IP address.

In some embodiments, the IP address is a local IP address to a local network including the first computer and the first set of rules does not allow access to resources associated with one or more local IP addresses in the local network.

In some embodiments, the executable code, when executed by the one or more processing devices further causes the one or more processing devices to receive the first request according to a proxy protocol.

In some embodiments, the executable code, when executed by the one or more processing devices, further causes the one or more processing devices to stop accepting the at least some subsequent requests from the second computer by stopping a connection between the first computer and the second computer.

In some embodiments, the executable code, when executed by the one or more processing devices, further causes the one or more processing devices to stop accepting the at least some subsequent requests from the second computer by invalidating the first set of rules.

In another aspect of the invention, a system for managing access includes a first computer connected to a network and configured to control access to the protected resource, the first computer comprising one or more processing devices and one or more memory devices operably coupled to the one or more processing devices. The one or more memory devices may store executable code, that, when executed by the one or more processing devices, causes the one or more processing devices to: obtain a first set of rules formulated to determine whether resource requests should be issued by a second computer to a third computer; obtain a second set of rules formulated to determine whether the resource requests from the second computer should be allowed by the third computer; and provide the first set of rules to the second computer and providing the second set of rules to the third computer; wherein one or more requests of the resource requests that are allowed according to the first set of rules are not allowed according to the second set of rules.

In some embodiments, the executable code, when executed by the one or more processing devices, further causes the one or more processing devices to provide the second set of rules to the third computer in bypass of the second computer.

In some embodiments, the executable code, when executed by the one or more processing devices, further causes the one or more processing devices to: receive, from the second computer, a first request for the first set of rules; and in response to the first request, transmit the first set of rules to the second computer and transmit the second set of rules to the third computer.

In some embodiments, the first set of rules and the second set of rules are configured such that a first request allowed according to the first set of rules and not allowed according to the second set of rules is associated with a resource identifier pointing to an invalid resource.

In some embodiments, the first set of rules and the second set of rules are configured such that a first request allowed according to the first set of rules and not allowed according to the second set of rules is associated with a domain name that should not be known to a user of the second computer.

In some embodiments, the first set of rules and the second set of rules are configured such that a first request allowed according to the first set of rules and not allowed according to the second set of rules is associated with an attempt by the second computer to scan the network protected by the first computer.

In another aspect of the invention, a system for managing access includes a first computer connected to a network and configured to control access to the protected resource, the first computer comprising one or more processing devices and one or more memory devices operably coupled to the one or more processing devices. The one or more memory devices may store executable code, that, when executed by the one or more processing devices, causes the one or more processing devices to: obtain one or more rules formulated to determine whether one or more resource requests should be sent from the first computer to a second computer; intercept, by a module on the first computer, a first resource request; apply the one or more rules to the first request; if the first resource request is allowed according to the one or more rules: (a) send the one or more rules to the second computer; and after performing (a), (b) send the first request to the second computer.

In some embodiments, the executable code, when executed by the one or more processing devices, further causes the one or more processing devices to: (c) after intercepting the first resource request, hold the first resource request on the first computer; perform (a) after performing (c); (d) continue performing (c) until receiving a response to (a) from the second computer; and perform (b) after performing (d).

In some embodiments, the executable code, when executed by the one or more processing devices, further causes the one or more processing devices to: perform (c) by temporarily storing at least part of the first resource request without sending the first resource request to the second computer; and after performing (b), delete the temporarily stored at least part of the first resource request.

In some embodiments, the executable code, when executed by the one or more processing devices, further causes the one or more processing devices to: obtain the one or more rules by: (c) after intercepting the first resource request, holding the first request on the first computer; and while performing (c): sending a second request to a third computer for the one or more rules; and receiving a response to the second request from the third computer, the response including the one or more rules; apply the one or more rules contained in the response from the third computer to the first resource request; and if the first resource request should be sent to the second computer according to the one or more rules, send at least part of the response received from the third computer to the second computer before sending the first resource request to the second computer.

In some embodiments, the executable code, when executed by the one or more processing devices, further causes the one or more processing devices to send the second request to the third computer by including at least part of the first resource request in the second request.

In some embodiments, the executable code, when executed by the one or more processing devices, further causes the one or more processing devices to: receive the response from the third computer by receiving a token containing the one or more rules, the token being cryptographically bound to a trusted identity; and send the one or more rules to the second computer by sending the token to the second computer.

In some embodiments, the token is a JavaScript Web Token containing a cryptographic signature.

In some embodiments, the executable code, when executed by the one or more processing devices, further causes the one or more processing devices to send the first resource request to the second computer only after verifying validity of the token.

In some embodiments, the executable code, when executed by the one or more processing devices, further causes the one or more processing devices to: store the one or more rules obtained from the response; intercept a third resource request; apply the stored one or more rules to the third resource request; and if the third resource request should be sent to the second computer according to the stored one or more rules, send the third resource request to the second computer without sending the one or more rules to the second computer after the third resource request was intercepted.

In some embodiments, the executable code, when executed by the one or more processing devices, further causes the one or more processing devices to intercept the first request by using a proxy on the first computer to terminate the first resource request and generate a new request, wherein the proxy is selected from the group consisting of a transport control protocol (TCP) proxy, a user datagram protocol (UDP) proxy, and a NetBios proxy.

In some embodiments, the executable code, when executed by the one or more processing devices, further causes the one or more processing devices to hold the first request by delaying generation of the new request while obtaining, by the proxy on the first computer, the one or more rules. In some embodiments, the proxy is a transparent proxy.

In another aspect of the invention, a system for managing access includes a first computer connected to a network and configured to control access to the protected resource, the first computer comprising one or more processing devices and one or more memory devices operably coupled to the one or more processing devices. The one or more memory devices may store executable code, that, when executed by the one or more processing devices, causes the one or more processing devices to: obtain a first rule set containing one or more rules formulated to determine whether one or more intercepted resource requests are for a protected resource; intercept a first request of the one or more intercepted resource requests from a second computer; and if the first request matches one or more rules in the first rule set perform in order: holding the first request on the first computer; sending a request to a third computer for a second rule set including one or more rules formulated to determine whether the one or more intercepted resource requests are allowed to be issued by the first computer; receiving the second rule set; if the first request is allowed according to the second rule set, sending the first request to the second computer; and if the first request is not allowed according to the second rule set, blocking the first request.

In some embodiments, the one or more rules in at least one of the first rule set and the second rule set specify that one or more requests of the one or more intercepted requests are associated with the second computer.

In some embodiments, the executable code, when executed by the one or more processing devices, further causes the one or more processing devices to: after receiving the second rule set, intercept a second request of the one or more intercepted requests; check if the second rule set contains one or more rules formulated to determine if the second request is allowed to be issued by the first computer; if the second rule set contains one or more of the rules associated with the second request: if the second request is allowed according to the second rule set, send the second request to the second computer without issuing a request for one or more rules from the third computer; and if the second request is not allowed according to the second set, block the second request on the first computer; and if the second set does not contain one or more rules associated with the second request: hold the second request on the first computer, send, by the first computer to the third computer, a request for a third rule set including one or more rules formulated to determine whether the second request, is allowed to be issued by the first computer; receive the third rule set; if the second request is allowed according to the third rule set, send the second request to the second computer; and if the second request is not allowed according to the third rule set, block the second request.

In some embodiments, the first request is associated with a first access policy and the second request is associated with a second access policy different from the first access policy. The executable code, when executed by the one or more processing devices may further causes the one or more processing devices to, after sending the request for the third rule set, receive a challenge requiring a user of the first computer to be authenticated according to the second access policy associated with the second request.

In some embodiments, access to one or more resources allowed according to the third rule set requires multi-factor user authentication, while access to one or more resources allowed according to the second rule set does not require multi-factor user authentication.

In some embodiments, the executable code, when executed by the one or more processing devices, further causes the one or more processing devices to: after receiving the second rule set, intercept a second request; check if the second rule set remains valid; and if the second set is valid: if the second request is allowed according to the second rule set, send the second request to the second computer without issuing a request for one or more rules from the third computer; and if the second request is not allowed according to the second rule set, block the second request; and if the second rule set is invalid: hold the second request; send, to the third computer, a request for a valid instance of the second rule set; receive the valid instance of the second rule set; if the second request is allowed according to the valid instance of the second rule set, send the second request to the second computer; and if the second request is not allowed according to the valid instance of the second rule set, block the second request.

In some embodiments, the second rule set is associated with an expiration time. The executable code, when executed by the one or more processing devices, may further cause the one or more processing devices to check if the second request remain valid by checking that the second set has not expired before the second request was intercepted.

In another aspect of the invention, a system for managing access includes a first computer connected to a network and configured to control access to the protected resource, the first computer comprising one or more processing devices and one or more memory devices operably coupled to the one or more processing devices. The one or more memory devices may store executable code, that, when executed by the one or more processing devices, causes the one or more processing devices to store a first rule set including one or more rules formulated to determine whether one or more incoming requests from a second computer can be allowed to proceed; receive a first request for a resource from the second computer; determine that the first request is blocked according to the first rule set; in response to determining that the first request is blocked according to the first rule set, preventing request allowance according to the first rule set; receive a second rule set including one or more rules formulated to determine whether the one more incoming requests from the second computer can be allowed to proceed; evaluate whether a time of receipt of the second rule set is after a time one or after blocking of the first request; if the time of receipt of the second rule set is before the time on or after blocking of the first request, prevent request allowance according to the second rule set; and if the time of receipt of the second rule set is after the time on or after blocking of the first request, allow one or more subsequent requests that are allowable according to the second rule set.

In some embodiments, the executable code, when executed by the one or more processing devices, further causes the one or more processing devices to derive the second rule set from a token received by the first computer, the token also containing a first value at least partially derived from a time when the token was issued; and if the first value indicates that the time when the token was issued is later than the time on or after blocking of the first request, determine that the token and the second rule set is valid.

In some embodiments, the executable code, when executed by the one or more processing devices, further causes the one or more processing devices to allow the one or more subsequent requests from the first computer if allowable according to the second rule set and only if the one or more subsequent requests were received from a third computer, different from the first computer.

In some embodiments, the executable code, when executed by the one or more processing devices, further causes the one or more processing devices to before receiving the second set, send a message to the third computer, indicating that the first request was blocked.

In some embodiments, the executable code, when executed by the one or more processing devices, further causes the one or more processing devices to: derive the second rule set from a token received by the first computer; and only if the token was cryptographically signed by a trusted entity after the first request was blocked, allow one or more subsequent requests from the second computer.

In some embodiments, the executable code, when executed by the one or more processing devices, further causes the one or more processing devices to receive the second rule set from the second computer.

In some embodiments, the system further includes a third computer. The third computer may be configured to generate the second rule set in response to a request from the second computer and transmit the second rule set to the second computer.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
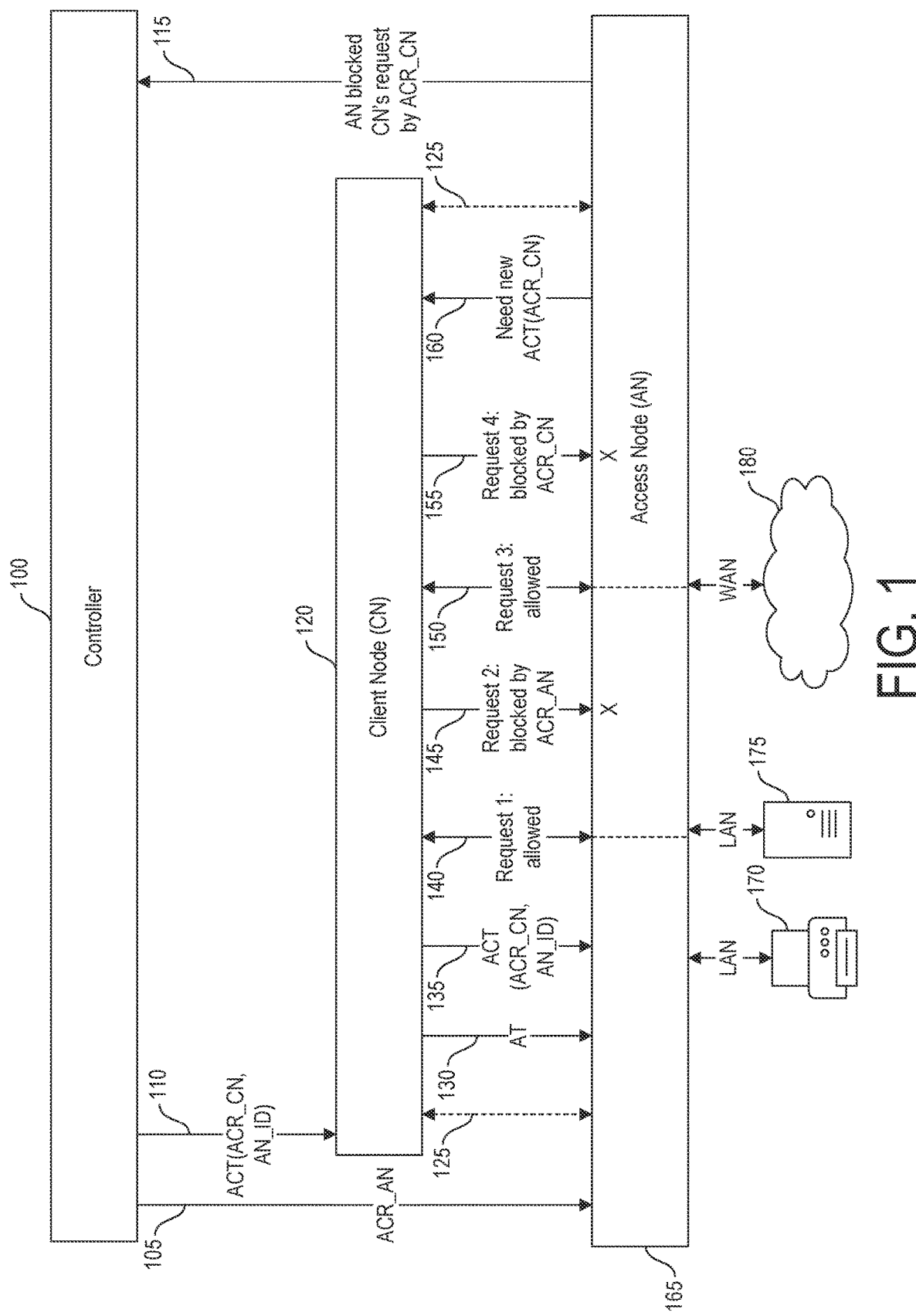
FIG. 1 is a schematic block diagram of a network environment for controlling secure access from a client node to a resource protected by an access node in accordance with an embodiment of the present invention.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The invention has been developed in response to the present state of the art and, in particular, in response to the problems and needs in the art that have not yet been fully solved by currently available apparatus and methods.

Embodiments in accordance with the present invention may be embodied as an apparatus, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the present invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

Computer program code for carrying out operations of the present invention may be written in any combination of one or more programming languages, including an object-oriented programming language such as Java, Smalltalk, C++, or the like and conventional procedural programming languages, such as the "C" programming language or similar programming languages. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

When implementing Zero Trust Network Access (ATNA), a trust broker may use an access control list (ACL) to control per-request access to resources from specific client. An ACL may include one or more rules for client requests matching listed patterns, such as domain name, Internet Protocol (IP) address or access port. An ACL associated with a specific authenticated client (authenticated user on authenticated device) may vary depending on user role, level of authentication, current location, time of day, user's device security posture, and other factors.

If a trust broker's node containing a gateway or a proxy is deployed in the cloud, the client may be required to forward all user traffic through that node, for instance, by using a VPN or specifying a system proxy. If the same endpoint device is used both for personal use and to access protected resources of the enterprise (usage pattern known as "Bring Your Own Device", or BYOD), this may have significant disadvantages both for the enterprise (need to forward or filter personal traffic) and for the user (privacy risks and localization errors due to the change in outgoing IP address).

To address this issue, client-initiated ZTNA implementations that follow the Cloud Security Alliance (CSA) specification for a Software Defined Perimeter (SDP) may include an endpoint agent executing on a client node and that sends its security context to a controller. The controller authenticates the user on the device and returns a set of rules such as initiating host service message (IHSM) or ACL to the endpoint agent. The controller may also provide another set of rules (Accepting Host Service Message (AHSM or ACL) to a gateway of a protected network. In these implementations, the endpoint agent may bypass all traffic that doesn't match the set of rules provided by the controller. The gateway may use its own set of rules to block unauthorized traffic from the client node and forward all security events to a Security Information and Event Management (SIEM) system.

In prior implementations, the SDP doesn't specify which actions to perform after a request for protected resource is blocked by a client agent or a gateway. An attempt to access blocked resources may indicate that either the client node is compromised (didn't enforce the ACL received from the controller, used expired ACL etc.), or that the client node is performing an attempt to scan the protected network.

However, not every blocked request should be treated as a security threat: both the list of resources protected by the gateway and user permissions may change during the user's session; a user may be trying to check if a resource is available before requesting an access from administrator; a domain-based request could be blocked based on a locally resolved IP address that is not known to the client, etc.

The Security Information and Event Management (STEM) services may detect that user or Client Node (CN) represents a security risk by analyzing behavior anomalies, but this usually takes time: it may not immediately prevent the CN from scanning the network, or from trying to use recently expired ACL to determine the gateway's tolerance limits.

Therefore, there is a need for a real-time detection and mitigation of security threats caused by attempts to request disallowed resources. It would be an advantage to do this without limiting the ability of authenticated users to issue benign requests that could be blocked during normal operations. Preferably, such security threats should be detected by the gateway even if most of the disallowed requests are blocked by the client: the client could be compromised or prevented from reporting discovered threats.

FIG. 1 illustrates a network environment for controlling secure access from the Client Node (CN) 120 to resources protected by an Access Node (AN) 165. Examples of protected resources may include a printer 170 and a file server 175 accessible by the AN 164 over a local area network (LAN). The protected resources may further include cloud-based resources 180 accessible by the AN 165 over a wide area network (WAN).

In the illustrated embodiment, both the AN 165 and the CN 120 are connected to a controller 100 by corresponding connections 105 and 110, respectively. Each of these connections 106, 110 may be established over the LAN, WAN, the Internet, or some other network, depending on the relative locations of the AN 165, controller 100, and CN 120. In some implementations, connections are established using secure protocols, such as TLS (transport layer security). The CN 120 and the AN 165 may authenticate with the controller 100 during a TLS handshake using a public key of the controller 100. In other implementations, at least one of the connections 105, 110 could be established without using a secure protocol. For instance, if the CN 120 and controller 100 reside on the same LAN and/or can communicate over encrypted Wi-Fi.

In some embodiments, the AN 165 initiates a connection to the controller 100 when it becomes active or needs an update. In some instances, the AN 165 maintains a persistent connection to the controller 100 to receive commands and updates. The CN 120 may initiate a connection to the controller 100 at the session start, after intercepting a request for a protected resource, as described below, or to receive commands and updates. In other embodiments, the controller 100 initiates connections to the AN 165 and/or the CN 120 (for instance, if the AN 165 and/or CN 120 has a public IP address, or resides on the same LAN as the controller 100).

The controller 100 may generate at least two sets of access control rules (ACR): ACR_AN, sent to the AN 165 through the connection 105, and ACR_CN, sent to the CN 120 through the connection 110. In the description below, the term ACR may be understood to refer to a set of one or more rules or algorithms used to decide which action to perform after receiving a request for a protected resource. In some implementations, an ACR is derived from an access control lists (ACL) such as a networking ACL. In other implementations, an ACR may be derived from role-based access control (RBAC) permissions. In other implementations, an ACR is generated by using a custom format.

In some embodiments, the one or more rules of the ACRs referenced above may include a pattern. For instance, the pattern may include one or more domains with wildcards, IP addresses or IP ranges, ports or port ranges, parts of the request header, etc. For example, the pattern may be specified using regular expressions or other formatting. Each rule may include a pattern and an action to apply to a request matching the pattern (for instance, allow or disallow). In other embodiments, the one or more rules may contain information that may be compared to other parameters of a request to determine whether the rule applies (lower-level protocol: TCP vs UDP; higher-level protocol: HTTP vs HTTPS vs NetBios) or with prior history (was request preceded by another request with a specific pattern). In some implementations, the one or more rules contain information associated with an application that issued the request; in some instances, the issuing application is recognized by the name associated with its process identifier; in other instances, the issuing application is recognized by one or more request headers, such as "user agent" header. In some implementations, one or more rules are conditioned on information associated with device posture, such as managed/unmanaged, device model or operating system (OS) version.

In some embodiments, actions include different routing choices (for instance, whether the request can be sent directly between CN 120 and AN 165, or must be forwarded through a relay), different access policies (for instance, whether request can only be sent if a user of the CN 120 has passed multi-factor authentication), or conditional allow/deny decisions dependent on the time of day, location of the requestor or load of the AN 165, such as CPU utilization, number of concurrent users or consumed bandwidth. In some embodiments, the one or more rules do not provide direct association between the matching pattern and an action. Instead, the rules are used to vectorize the request by multiple parameters (domain, protocol, port range, IP range, time, etc.), while applying the one or more rules to determine the action comprises applying one or more algorithms to the vectorized representation of the request: for instance, one or more classification algorithms from the field of machine learning, such as a random forest or a neural network.

In the illustrated implementation, ACR_AN may be delivered from the controller 100 to the AN 165 over connection 105 without being signed or encrypted by the controller 100. In contrast, ACR_CN may be provided to AN 165 as part of a verifiable access control token (ACT), such as JavaScript Web Token (JWT) cryptographically signed or encrypted with controller's 100 private key. In some instances, the ACT also contains an identifier of the AN 165 (AN_ID) and some or all of a token issue time, a token expiration time, a user identifier and a device identifier corresponding to the client node 120. In other implementations, ACT may have a different format, for instance one using Security Assertion Markup Language (SAML), a custom format using JavaScript Object Notation (JSON), Extensible Markup Language (XML), or another format that serializes structured data, for instance Protocol Buffer (protobuf). In some other implementation, instead of using a single ACT, ACR_CN could be provided as part of two or more messages: for instance, a set of messages cryptographically signed or encrypted with controller's 100 private key.

In the illustrated implementation, authenticity of ACR_AN may verified by the fact that it is delivered over the secure, authenticated connection between the AN 165 and the Controller 100. In some implementations ACR_CN is delivered inside the signed or encrypted ACT because it is then forwarded (135) from the CN to the AN 165. The AN 165 may then verify validity of ACR_CN without receiving it directly from the controller 100. In other implementations, both ACRs are delivered to the AN 165 inside signed or encrypted ACTs, or directly from the controller 100. Forwarding of ACR_CN through the CN 120 has an advantage of avoiding the race condition: AN 165 is guaranteed to receive ACR_CN before receiving a request for a protected resource from the CN 120, as described below.

In some implementations, AN 165 requests ACR_AN from the controller 100 soon after it is activated. The CN 120 may request ACR_CN after intercepting a request that needs permission from the controller 100 to proceed. In other implementations, at least one ACR_CN can be requested by the CN 120 soon after CN session start, without waiting for an intercepted request.

Figure 3:
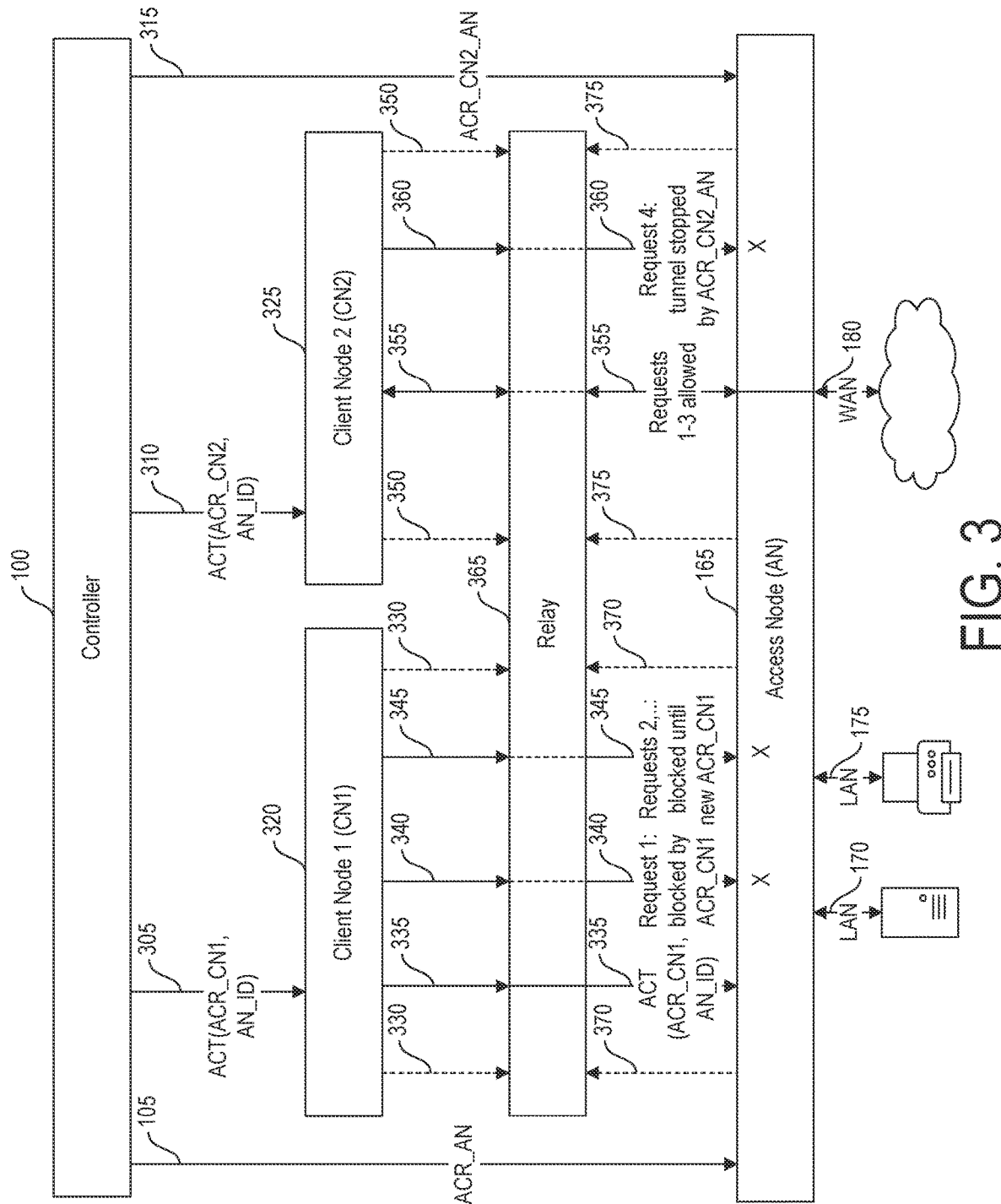
FIG. 3 is a schematic diagram of a method for locally intercepting the traffic intended for a remote proxy associated with a VPN according to an embodiment of the present invention.

In the illustrated implementation, CN 120 establishes one or more secure connections 125 to the AN 165, to be used as main conduits of data exchange between the CN 120 and the AN 165. In some implementation, this is a direct connection between the CN 120 and the AN 165: CN 120 connects to AN's 165 public IP address, or CN 120 and AN 165 connect to each other using Interactive Connectivity Establishment (ICE) Protocol for the Network Access Table (NAT) traversal over Universal Datagram Protocol (UDP). In other implementations, such as illustrated by FIG. 3, both CN 120 and AN 165 connect to a relay that forwards their traffic.

In some instances, both CN 120 and AN 165 contain proxies, and at least some secure connections carry payloads and headers following a proxy protocol (e.g., socket secure (SOCKS) 5, hypertext transfer protocol (HTTP) 2, HTTP 3, etc.). In other instances, secure connections are formed by encapsulating packets traveling between the CN 120 and the AN 165. For example, this may include forming a Virtual Private Network (VPN) tunnel following a VPN protocol (e.g., IP secure (IPSEC), OpenVPN, etc.). In some instances, CN 120 opens one or more secure connections 125 to AN 165 after receiving the ACT containing AN_ID that references the AN 165.

In the illustrated implementation CN 120 authenticates itself to the AN 165 by sending an Authentication Token (AT) 130. In some instances, the AT contains both the CN's 120 public key and a value, the public key being signed or encrypted by the controller 100 associated with a known domain and the public key and the value derived from the keying material of at least one connection 125 (for instance, "handshake finished" message created as a part of a TLS handshake and known to both AN 165 and CN 120). The value may be signed or encrypted by the CN's 120 private key. In some instances, the AT is formatted as JavaScript Web Token (JWT) cryptographically signed or encrypted with the CN's 120 private key. In other implementations, the AT may have different format, for instance one using Security Assertion Markup Language (SAML), or a custom format using JavaScript Object Notation (JSON) or Extensible Markup Language (XML), or another format that serializes structured data, for instance Protocol Buffer (protobuf).

The AN 165 may verify that CN's 120 public key is signed or encrypted by the controller 100, and that the value derived from the keying material is signed or encrypted by the CN 120. As a result, the AN 165 can both authenticate the CN 120 and cryptographically bind it to the connection 125 without providing the CN 120 with a signed secure socket layer (SSL) certificate (cryptographic binding to the secure connection is helpful to protect from the man-in-the-middle attack). This simplifies provisioning of multiple CNs 120 and prevents the possibility of compromising multiple CNs 120 by exfiltrating a common wildcard certificate.

In some implementations, the AN 165 is associated with a known domain and is authenticated by the signed SSL certificate for that domain during the TLS handshake between the AN 165 and the CN 120. If AN 165 is deployed in the managed environment (within the protected network or in the cloud, with a trusted owner or administrator), the risk of exfiltration of the signed SSL certificate from the AN 165 is much lower than from the CN 120 deployed on the end-user's device. In other implementations, the AN 165 authenticates itself to the CN 120 by sending the AT. In some other implementations, both CN 120 and AN 165 authenticate themselves with one another during the TLS handshake.

In some implementations, CN 120 extracts ACR_CN from the ACT received over the connection 110 before forwarding (135) that ACT to the AN 165. Before issuing a request for protected resource from the AN 165, CN 120 may verify that the request is allowed according to ACR_CN. However, in some cases, the CN 120 may not know if a request allowed according to ACR_CN is also allowed according to ACR_AN.

In the illustrated implementation, AN 165 receives, from the CN 120, a request for a protected resource 140 after receiving both AT 130 and ACR_CN 135. In other implementations, AN 165 may receive the request from the CN 120 earlier, but hold its processing until it receives at least one of the AT and the ACR_CN. In some embodiments, AN 165 allows CN's 120 request for protected resource to proceed only if it is allowed according to both ACR_CN and ACR_AN. However, blocking of the request according to ACR_CN may have a different effect on the processing of subsequent requests than blocking of the request according to ACR_AN.

In the illustrated example, request 1 (140) is allowed according to both ACR_CN and ACR_AN. In response to determining that request 1 is allowed per ACR_CN and ACR_AN, AN 165 forwards the request to a destination of the request, e.g., the file server 175, and sends a response to the request from the destination back to the CN 120.

In another instance, a request 2 (145) is allowed according to the ACR_CN but blocked according to the ACR_AN. In response to this, the AN 165 blocks request 2 but continues to process subsequent requests from the CN 120 and, for instance, allows request 3 (150) to proceed.

In another instance, a request 4 (155) is blocked according to the ACR_CN. In response to this, instead of continuing to process subsequent requests from the CN 120, the AN 165 treats this as an indication of a security threat and may take remedial action. Remedial action may include some or all of: the AN 165 transmitting a notification to the CN 120, the notification instructing the CN 120 to request a new ACR_CN from the controller 100; reporting the incident to the controller 100 (115); and stopping accepting subsequent requests from the CN 120 until the CN 120 provides a new ACR_CN. Upon receiving the incident report, the controller 100 may, for instance, change a user's group of the CN 120 to "untrusted" and/or changing a set of protected resources that will be listed in the new ACR_CN obtained by the CN 120 after the incident report.

The AN 165 may perform these additional actions if the request is blocked according to the ACR_CN because the CN 120 operating accordingly to described implementation should have prevented every request not allowed according to ACR_CN from being issued. The fact that AN 165 has received such a request indicates that the CN 120 doesn't work as expected, for instance due to malfunction or deliberate modification. On the other side, a correctly operating CN 120 might not block a request that is later blocked according to the ACR_AN, because the CN 120 does not have access to contents of the ACR_AN. The ACR_AN may be more restrictive than ACR_CN: for instance, an administrator of the AN 165 may specify additional geo- and time-based limitations for allowed requests. Therefore, blocking of the request by the ACR_AN in the described implementation isn't considered a security breach.

In some implementations, at least one of the ACR_CN or ACR_AN is not used to control the access to protected resources for some time intervals. During one or more such intervals, at least one of the CN 120 and the AN 165 may run in a "passive" mode that lets all traffic through while the AN 165 generates logs of detected requests for protected resources. In some implementations, these logs are used to generate at least one of the ACR_CN and the ACR_AN. After the ACR_CN and ACR_AN are generated in this manner and the ACR_CN is sent to the CN 120, at least one of the CN 120 and the AN 165 is switched to a "secure" mode that uses its ACR generated from the information derived from one or more logs. In some instances, the CN 120 and/or the AN 165 in "secure" mode blocks all requests not observed in the "passive" mode. In some instances, the "passive" mode is used during a training period after the first use of the CN 120 and/or the AN 165.

In some implementations, an initial version of one or both of the ACR_CN and the ACR_AN contains one or more rules. During a specific period, one or both of the CN 120 and the AN 165 generate logs of detected requests for protected resources allowed according to the corresponding ACR (CN 120 logs requests permitted according to ACR_CN and AN 165 logs requests permitted according to ACR_AN). Following ending of the specific period, information derived from these logs may then be used to generate new versions one or both of the ACR_CN and the ACR_AN (logs of CN 120 used to update ACR_CN, logs of AN 165 used to update ACR_AN). The new versions may block access to at least some protected resources that were allowed according to the previous ACR. For instance, a new ACR may block requests to a resource that wasn't requested during the specific period.

Figure 2:
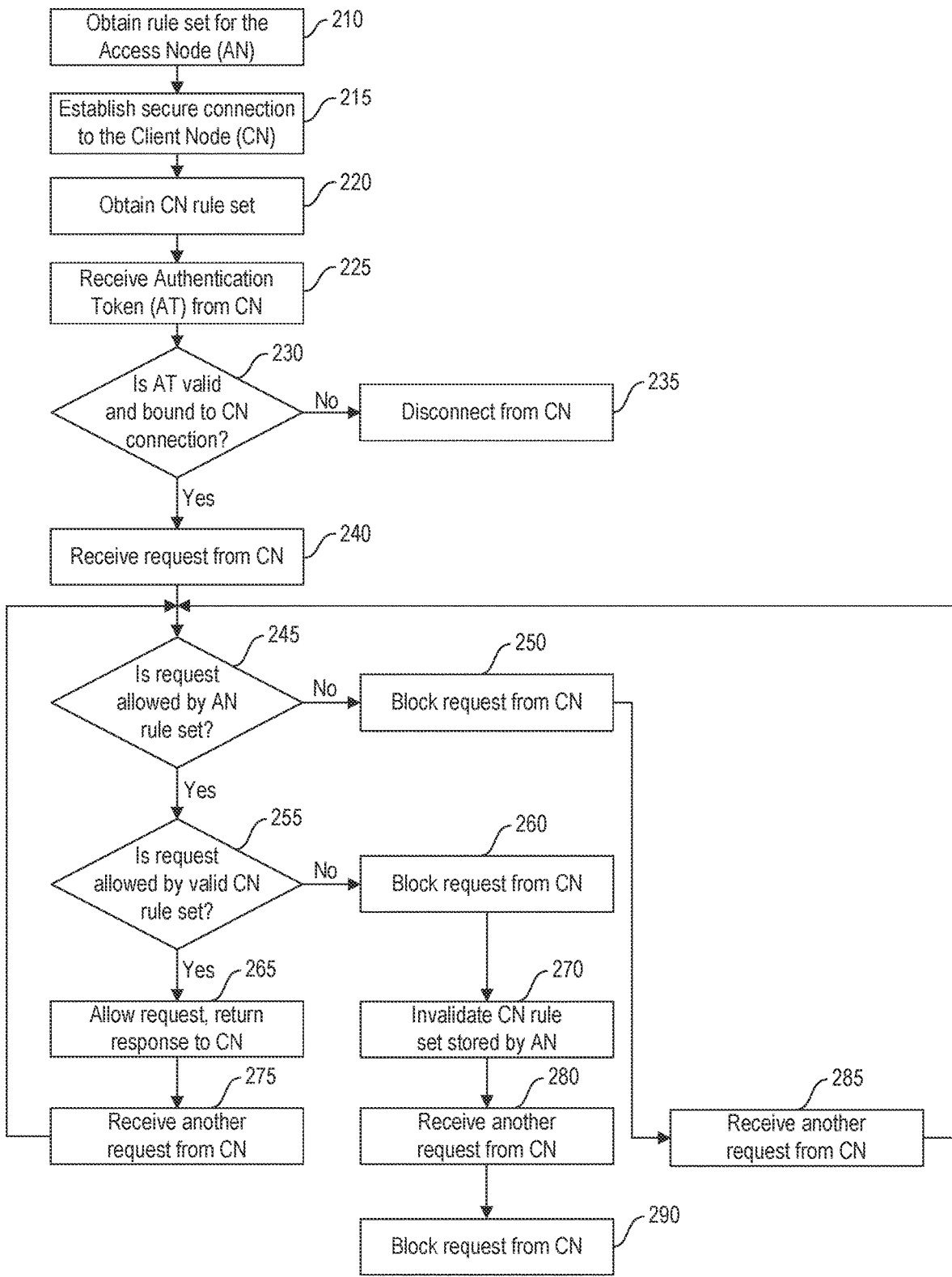
FIG. 2 is a process flow diagram of a method for processing resource requests from a client node by an access node in accordance with an embodiment of the present invention.

FIG. 2 illustrates a process flow diagram of an example method for processing CN's 120 resource requests by the AN 165. In the illustrated implementation, AN 165 obtains 210 a rule set, such as ACR_AN, and then establishes 215 a secure connection to the CN 120. The AN 165 obtains 220 a CN rule set, such as ACR_CN forwarded from the controller 100 and also receives 225 the AT from the CN 120 as described above. The AN 165 then checks 230 whether the AT is valid (for instance, whether it contains CN's 120 public key signed by the controller's 100 private key) and is bound to the secure connection between the AN 165 and the CN 120 (e.g., includes the value derived from the connection's keying material, known to both CN 120 and AN 165, or is signed by the CN's 120 private key). If the AT fails any of these checks, the AN 165 disconnects 235 from the CN 120 (or, in alternative implementation, requests CN 120 to provide a valid AT).

In some implementations, AN 165 also validates the CN rule set received at the step 220, for instance by verifying that it is signed or encrypted by the controller 100 having a known public key. In some instances, AN 165 confirms to the CN 120 that it received a valid ACR_CN and AT before receiving 240 a request for a protected resource.

After receiving 240 the request, AN 165 may check one or more rule sets in order to determine whether request should be allowed to proceed. In the illustrated embodiment, the AN 165 first checks 245 the request against the AN rule set and then, if the request is allowed according to one or more rules of the AN rule set, checks 255 the request against the CN rule set.

If the request is allowed according to both rule sets, the AN 165 forwards the request to the destination server referenced by the request and sends 265 a response to the request received from the destination server back to the CN 120. This same cycle may repeat from step 245 after receiving 275 a next request from the CN 120.

If the request is not allowed according to the AN rule set, AN 165 blocks 250 this request but remains ready to receive 285 another request from the CN 120: CN 120 may not have access to the AN rule set and why the request wasn't allowed according to the AN rule set. However, if the request is not allowed according to the CN rule set at step 255, AN 165 not only blocks 260 that request, but also blocks subsequent requests from the CN 120 that would be allowed according to the CN rule set. This may include invalidating 270 the CN rule set stored on the AN 165 (for instance, deleting the CN rule set from its storage, or replacing it with another rule set "block all"). After receiving 280 another request, the AN 165 then blocks 290 that request, without checking the previously received CN rule set.

As described above, the AN 165 may also notify at least one of the CN 120 and the controller 100 that no other requests from CN 120 would be accepted, at least until AN 165 receives a new CN rule set (new ACR_CN) created after the incident.

In some implementations, the AN 165 checks the request against the CN rule set (ACR_CN) first, and then checks it against the AN rule set (ACR_AN) only it the request is allowed according to the CN rule set. In other implementations, the AN 165 checks request against both rule sets in parallel.

In the illustrated embodiment, the AN 165 continues to maintain the secure connection to the CN 120 after invalidating 270 the CN rule set (ACR_CN) and starts accepting new requests over the same connection after receiving the new CN rule set (ACR_CN) without receiving a new AT. In other embodiments, the AN 165 closes the secure connection with CN 120 after determining 255 that CN's 120 request is blocked according to the CN rule set, requiring CN 120 to open a new connection to the AN 165 and to provide both a new AT and a new CN rule set (ACR_CN) before starting to issue new requests.

As used in the embodiments hereinbelow, blocking, stopping, or disallowing subsequent requests by a CN deemed to be a security risk due to issuing a request disallowed according to an ACR provided to the CN may include some or all of the options described above (blocking, invalidating ACR_CN of the CN, and closing a secured connection to the CN).

FIG. 3 illustrates a network environment for controlling secure access from the two client nodes, CN1 320 and CN2 325, to the resources protected by the same AN 165. In the illustrated implementation, instead of establishing direct connection between the AN 165 and each CN 320, 325, the AN 165 and both CNs 320, 325 exchange traffic through a relay 365. CN1 320 and CN2 325 may establish connections 330 and 350, respectively, to the relay 365. The AN 165 may establish connections 370 and 375 to the same relay. Connections 330, 370 may be enabled to carry traffic between the CN1 320 and the AN 165; connections 350, 375 may be enabled to carry traffic between the CN2 325 and the AN 165. Each connection 330, 350, 370, 375 may be enabled to carry traffic in both forward and reverse directions. In some instances, at least some of these connections 330, 350, 370, 375 are VPN tunnels, for instance using OpenVPN or IPSEC protocol. In other instances, at least some of these connections 330, 350, 370, 375 are proxy connections.

In the illustrated implementation, AN 165 opens one or more separate connections 370, 375 to the relay 365 for each CN 320, 325, respectively. In other implementations, the AN 165 opens one or more connections to the relay 365 that are used for traffic for two or more CNs 320, 325.

In comparison with direct connection between the CN 120 and the AN 165 depicted in FIG. 1, relay-based connection may increase the round-trip time between the CN 320, 325 and the AN 165, but communication may be performed by the AN 165 without having a public IP address or using a special type of network address translation (NAT). In some instances, relay-based connections may be suitable even if CN 320, 325 or AN 165, or both, are behind NATs or firewalls.

In some implementations, traffic between at least one CN 320, 325 and AN 165 is encrypted end-to-end, for instance, by using Diffie-Hellman algorithm to create shared keying material for the data exchange according to TLS protocol. In some instances, one or more end-to-end TLS connections carrying traffic between CN 320, 325 and AN 165 are sent inside the VPN tunnels to the relay 365 established by the AN 165 and the CN 320, 325. In some embodiments, these wrapper tunnels are not encrypted because they only carry encrypted traffic. In other instances, the relay 365 forwards the packets of the end-to-end TLS connection without creating the wrapper tunnels. End-to-end encryption decreases the attack surface, reducing the possibility that sensitive data could be observed or exfiltrated by the relay 365 if compromised.

In other implementations, traffic between at least one CN 320, 325 and the AN 165 isn't encrypted end-to-end: secure tunnels such as 330 and 370, 350 and 375 are terminated by the relay 365, which can observe and modify the traffic exchange between the CN 320, 325 and the AN 165. These implementations allow the relay 165 to perform additional functions, such as checking for malicious content. However, this increases the importance of protecting the relay 365 from being compromised.

In the illustrated implementation, the controller 100 generates two types of access control rules (ACR): ACR_AN, which AN 165 applies to traffic from two or more CNs 320, 325, and ACR_CN, which is associated with a specific CN 320, 325. Each CN 320, 325 may have its own ACR (ACR_CN1, ACR_CN2) that may be different from that of another CN 320, 325. The AN 165 may therefore apply different instances of ACR_CN to traffic exchange with different CNs 320, 325 (ACR_CN1 applied to CN1 320 and ACR_CN2 applied to CN2 325). Like the implementation illustrated in FIG. 1, the controller 100 may send ACR_AN 105 directly to the AN 165. The controller 100 may send 305 ACR_CN1 to CN1 320 inside an ACT. CN1 320 may then extract ACR_CN1 from the ACT and then forward 335 the ACT to the AN 165. After AN 165 receives ACR_CN1, CN1 320 sends 340 request 1 for a protected resource. If AN 165 blocks this request after applying ACR_CN1, the AN 165 stops accepting all subsequent requests received 345 from CN1, such as request 2, until the controller 100 provides a new version of ACR_CN1 (possibly, after the controller 100 reduces a list of resources available to CN1 in the new version of ACR_CN1 relative to the prior version in response to the blocking of request 1 as reported by AN 165 to the controller 100).

In some implementations, the controller 100 sends one ACR_AN per AN 165, and at least one ACR_CN per CN. In the illustrated example, for CN1, the controller 100 sends 305 ACR_CN1 to the CN1 320. The CN1 320 stores ACR_CN1 and forwards it to the AN 165. In the illustrated example, for the CN2 325, the controller 100 sends 310 ACR_CN2 to the CN2 325, while also sending 315 another ACR_CN2_AN directly to the AN 165. In this instance, CN2 325 doesn't forward ACR_CN2 to the AN 165. The AN 165 may omit confirming that ACR_CN2_AN is generated by the controller 100 because AN 165 receives ACR_CN2_AN over the encrypted TLS connection 315 that authenticates the controller 100.

In some implementations, AN 165 stores a single instance of the ACR_AN and uses it to evaluate traffic from multiple CNs 320, 325. The AN 165 may store separate instance of ACR_CN for each CN 320, 325, and uses each instance to evaluate the traffic from that instance's corresponding CN 320, 325. In the illustrated implementation, blocking 340 of the request from the CN1 320 according to ACR_CN1 doesn't affect processing of the requests from the CN2 325. After a request from the CN1 320 is blocked according to ACR_CN1, the AN 165 blocks 345 all subsequent requests from the CN1 320, for instance by invalidating ACR_CN1, until receiving a new ACR_CN1. However, in some embodiments, AN 165 doesn't stop accepting requests from the CN2 325, even if ACR_CN1 and ACR_CN2 contain the same sets of rules: AN continues to allow 355 requests from the CN2 325, until one of them is blocked 360 according to ACR_CN2_AN. In the illustrated implementation, for the CN2 325, AN 165 stops accepting subsequent requests from the CN2 325 by dropping the connection 375 to the relay 365, which, in its turn, drops connection 350 to the CN2 325. This may cause the CN2 325 to establish a new connection to the relay 365 and a new end-to-end TLS connection to the AN 165 before sending a new ACR and subsequent requests. In other instances, AN 165 only drops the end-to-end TLS connection to the CN2 325, while tunnels from AN 165 to the Relay and from CN2 325 to the relay 365 remain operational.

In some implementations, ACR_CN2_AN is different from ACR_CN2: ACR_CN2 is used by the CN2 325 to allow or disallow a request to the AN 165, while ACR_CN2_AN is used by the AN to decide whether to stop accepting this and subsequent requests in response to disallowing of the request.

In some instances, ACR_CN2_AN is formulated to block a request from the CN2 325 and subsequent requests if the user of the first computer was not expected to issue the request even if the first request was allowed according to the CN2 325.

In some implementations, one or more rules in ACR_CN2_AN are formulated to detect and block one or more requests to a resource identifier to a domain that shouldn't be known to a user of CN2 325, such as a honeypot domain or a resource identifier that is not associated with valid resource. In some implementation, a user of CN2 325 is prevented from accessing contents of ACR_CN2 in order to obtain the list of resources available through AN 165 from other sources (for instance, from admin's email, or from the prior interactions with the same resource over the same local network). If ACR_CN2 allows a request to a honeypot domain or a non-resolvable domain blocked according to ACR_CN2_AN, this allows detecting of the user who tries to extract ACR_CN2. If ACR_CN2 allows a request to an identifier not associated with a valid resource, such as a local IP address not assigned to a local resource and blocked according to ACR_CN2_AN, this allows detection of the user or an application that tries to perform an unauthorized scan of the local network. In these examples, ACR_CN2 blocks the majority of scan requests to protect the AN 165 but may allow one or more invalid requests to go through to the AN 165 to enable AN's 165 detection of a security threat.

Figure 4:
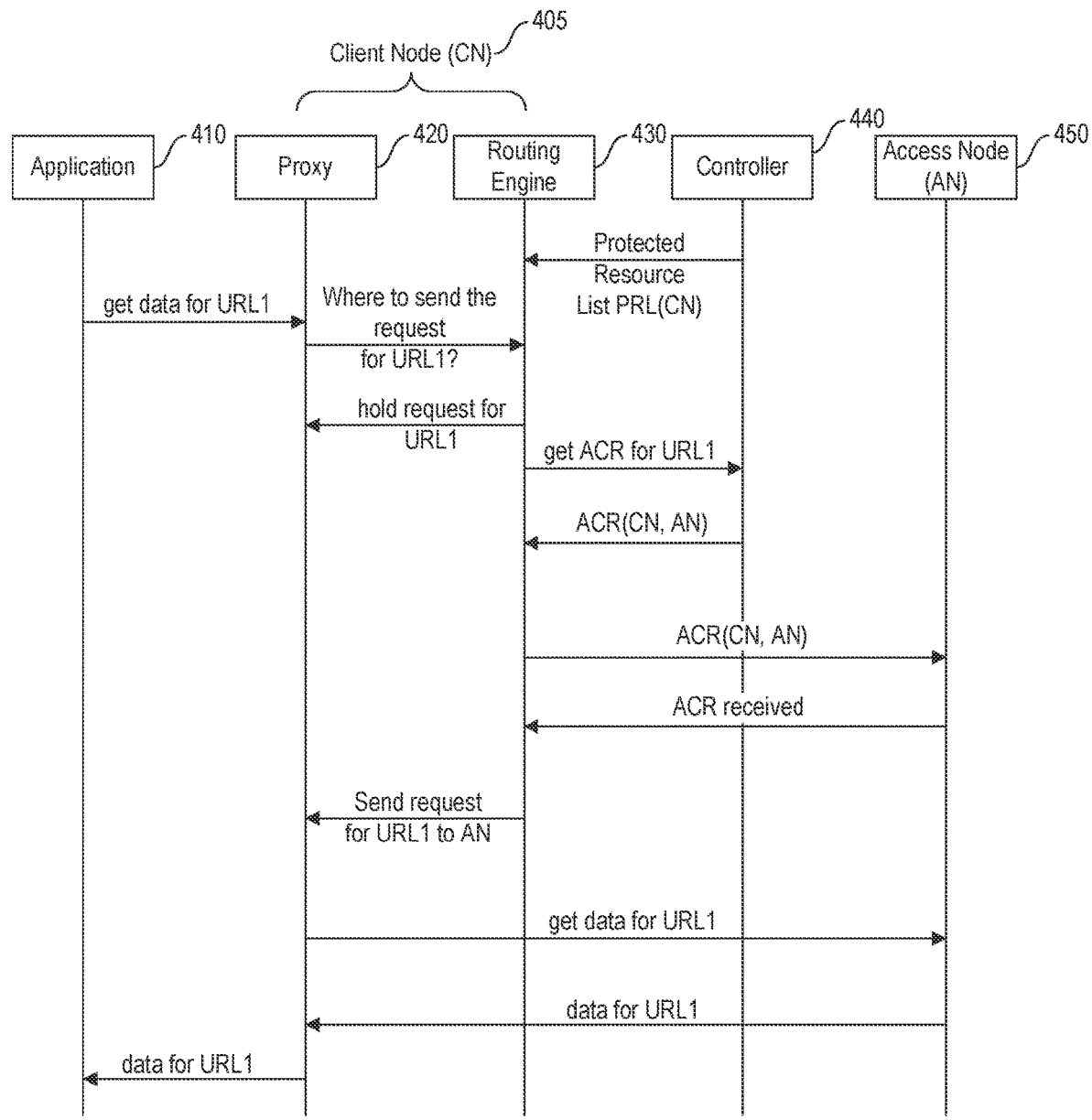
FIG. 4 is a sequence diagram depicting processing of outgoing resource requests by the client node before they are sent to the access node in accordance with an embodiment of the present invention.

FIG. 4 is a sequence diagram depicting processing of outgoing requests by CN 405 before they are sent to AN 450. In the illustrated implementation, CN 405 is split into a proxy 420 and a routing engine 430. The functionality of the CN 405 and AN 450 may be incorporated into the CN 120 and the AN 165 as described above. A controller 440 may be used. The functions ascribed to controller 440 may be incorporated into a controller 100 as described above.

In the illustrated implementation, routing engine 430 receives Protected Resource List (PRL) (CN) from the controller 440, such as at the start of a session. Proxy 420 receives a request for a protected resource referred to by URL1 from a client application 410 and terminates the received request, while keeping a connection with the application 410 open. The proxy 420 may store data from the request (for instance, URL1 and other HTTP headers) and then request the routing engine 430 for a destination to send the request.

If the protected resource referenced by the request matches an entry in the PRL(CN), the routing engine 430 tells the proxy 420 to delay issuing a new request to an AN (put request for URL1 on hold), and then asks the controller 440 for an ACR containing one or more rules matching the request and information describing where to send the request (e.g., a domain and/or IP address of the AN 450). In some instances, the routing engine 430 includes at least part of the request data when asking controller 440 for the ACR. After receiving the ACR, the routing engine 430 determines whether to allow the request according to the ACR, and, if so, forwards the ACR to the AN 450, receives its confirmation of receipt of the ACR, and then instructs the proxy 420 to send the request to the AN 450 (identified, for instance, by its domain or IP address). The proxy 420 reads the stored request data, generates a new request including the stored request data, sends the new request to the AN 450, receives a response to the new request from the AN 450 (e.g., the protected resource retrieved by the AN 450), and forwards the response to the requesting application 410.

The illustrated implementation may provide a controlled delay between a time when CN 405 receives a request from the application 410 and a time when it sends the request to the AN 450. This delay may be imposed when there is a need either to fetch the ACR and the routing information, or to send the ACR to the AN 450. The controlled delay may allow CN 405 to process intercepted requests for protected resources without prior knowledge whether the request is allowed and to which AN it should be directed. In some instances, the controlled delay is also used to perform additional user authentication, even if ACR and the routing information are already available.

In some embodiments, proxy 420 is a transparent proxy, for instance TCP proxy, UDP proxy or NetBios proxy.

In some implementations, proxy 420 is merged with a routing engine 430 into a single module. In other embodiments, CN 405 doesn't use the proxy 420 to terminate the connections from the client application 410. Instead, the application 410 itself requests routing engine 430 for a permission to issue the request and, if allowed, issues the request to the AN 450 after the controlled delay. The routing engine 430 may communicate an address of the AN 450 to the application 410 during the controlled delay.

In some implementations, an application 410 that issues the request and the CN 405 that intercept it reside on the same computer.

In other implementations, the application 410 and the CN 405 reside on different computers. In some instances of these implementations, the application 410, such as a web browser, resides on the client's computer and the CN 405 resides on a different computer, such as a cloud computer. In some of such instances, the client computer and the CN 405 are connected through a VPN tunnel, for instance one that uses IPSEC or OpenVPN protocol. The CN 405 may therefore intercept the requests coming from the application 410 that are transmitted through the VPN tunnel and return responses to the requests through that VPN tunnel. In some other such instances, the application 410 on the client computer is configured to use proxy settings referencing the CN proxy 420. The CN 405 then intercepts the request coming from the application 410 according to the proxy protocol and returns the response through the same proxy connection. In another such instances, the application 410 on the client computer is configured to use a DNS server that points at least some of the requested domains to the computer executing the CN 405. The CN 405 receives a DNS request and determines a requested domain from the header provided with the DNS request, such as Server Name Indicator (SNI) header for HTTPS request or HOST header for HTTP requests.

In some embodiments, one or more of the steps of receiving the PRL(CN), receiving the ACR, and sending ACR to AN 450 may be omitted. For instance, PRL(CN) may be provided as part of installation of CN 405 on the user's device; PRL(CN) may already include an ACR that matches the intercepted request and specifies the destination AN 450; or AN 450 may receive the ACR directly from the controller 440. In other embodiments, no PRL(CN) is obtained before the request is intercepted: instead, CN 405 holds the intercepted request before the controller 440 informs the CN 405 whether to send the request in bypass of the AN 450, block the request, or send the request to the AN 450.

Figure 5:
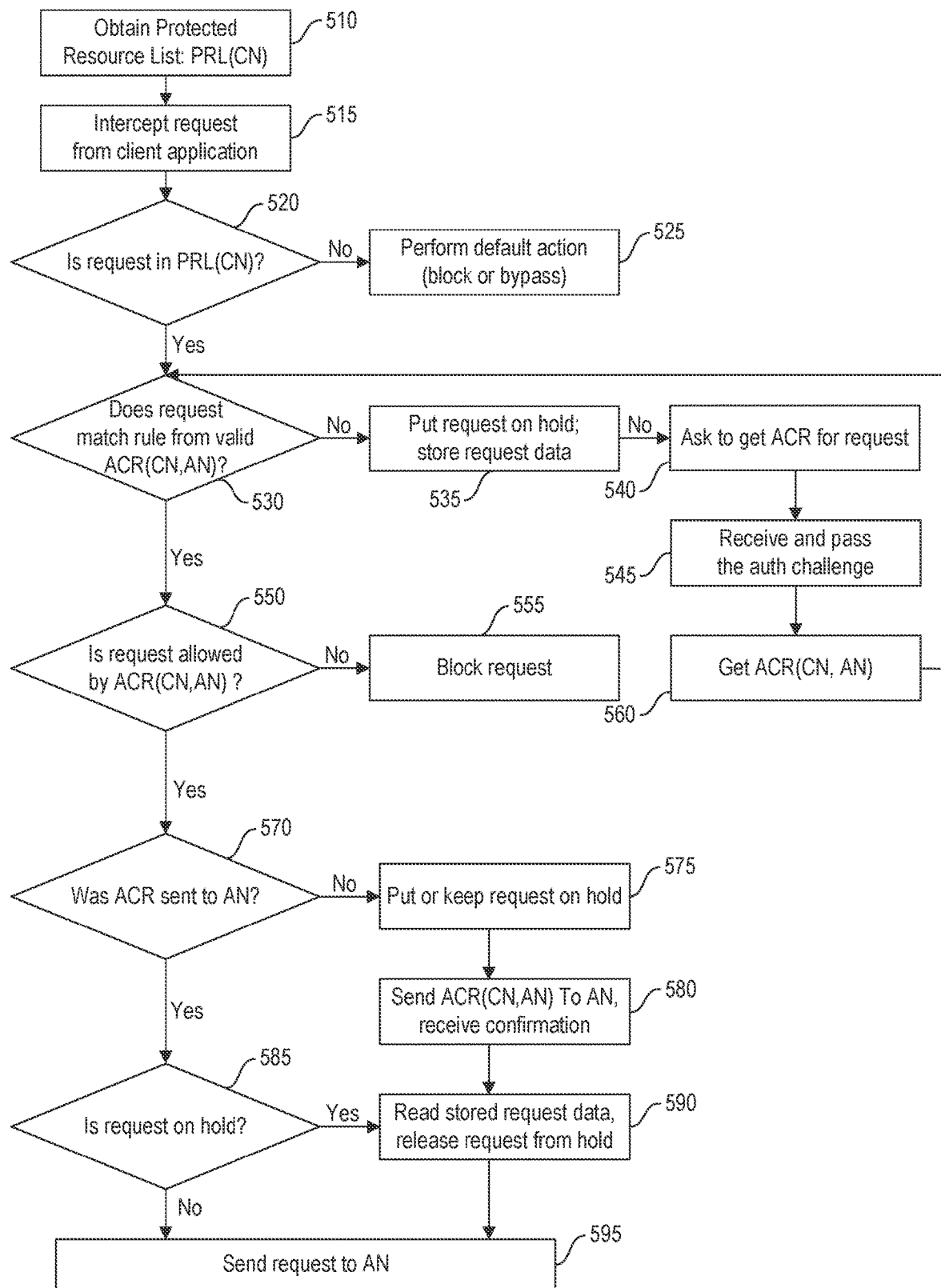
FIG. 5 is a process flow diagram of a method for processing of outgoing resource requests by the client node before they are sent to the access node in accordance with an embodiment of the present invention.

FIG. 5 illustrates a process flow diagram of a method for processing outgoing resource requests by the CN 405. In the illustrated embodiment, CN 405 obtains 510 PRL(CN), for instance, by issuing a request to the controller 440 when starting the session. After the PRL(CN) is obtained, CN 405 intercepts 515 a request from a client application 410 and compares 520 the request with the PRL(CN). If the request doesn't match any PRL rules in PRL(CN), CN 405 performs 525 an action specified for resources that don't have to be sent through the AN 450. This action may, for example, include blocking all such requests or sending them directly to a content server referenced by the request in bypass of the AN 450. In some instances, requests that don't match a PRL in PRL(CN) have their own set of rules, specifying whether to block, bypass or route matching request through a VPN server.

If the request is found 520 to match a PRL in PRL(CN) (recognized as a request for a protected resource), CN 405 may determine 530 whether there is a valid ACR and, if so, whether the request matches one or more rules of that ACR. In some instances, CN 405 recognizes that an ACR is valid if it was signed or encrypted by a trusted entity with a known public key, such as the controller 440, and isn't yet expired. If there is no valid ACR with one or more rules matching the intercepted request, CN 405 may put 535 the request on hold, for instance, by storing its data, and asks 540 the controller 440 to get the ACR with one or more rules matching the request. In some implementations, CN 405 sends at least part of the request, such as its URL, to the controller 440 when asking for the ACR.

In some instances, before returning the ACR, the controller 440 may determine that the user of the CN 405 must pass additional authentication before accessing the resource referenced in the request. For instance, the user may be allowed to start the session and access some of the protected resources after providing user name and password, but must perform multi-factor authentication (confirm receipt of SMS message, pass facial recognition, enter time-based token, etc.) before accessing one or more other resources that require higher protection level. In some implementations, after determining that the user must perform additional authentication, the controller 440 sends a response to the CN 405 with a redirection URL pointing to a Single Sign On (SSO) service page. After CN user receives and passes 545 the authentication challenge, CN 405 receives 560 the requested ACR, for instance inside the ACT signed by the controller 440. In some embodiments, the requested ACR remains valid until an authentication policy's expiration time; until that time, requests for protected resources matching received ACR do not require additional user authentication. If the CN user does not pass 545 the challenge, the request may be blocked.

After the ACR is received and found 530 to match a resource referenced by the currently intercepted request from step 515, CN 405 may check 550 if the request is allowed according to the one or more rules in the ACR. If the request is not allowed, CN 405 may block it and, in some instances, removes it from hold and deletes stored request data. In other instances, CN 405 reports the stored request data to the controller 440 before deletion or keeps stored data until one or more subsequent requests are received to analyze a request history.

If the intercepted request is allowed, CN 405 may check 570 if the ACR was already forwarded to the AN 450. If the ACR was already sent to AN 450, CN 405 may check 585 if the request is currently on hold. In some instances, the request can be put on hold while the user passes additional authentication, even if no new ACR is received from the controller 440. If the request was on hold, CN reads 590 its stored data and, in some instances, deletes it from storage. Next, CN sends 595 the request to the AN 450 and receives the AN's 450 response.

In the illustrated implementation, CN 405 forwards each ACR to the AN 450 after it is obtained from the controller 440 without imposing a hold period. The CN 405 may continue to hold 575 the request, receive 580 the confirmation that the ACR was received, and then read 590 stored request data and send 595 the request to the AN 450. Delaying the request to the AN 450 until the confirmation makes the data exchange more predictable, guaranteeing that AN 450 has the new ACR before receiving the request for which the ACR was sent.

In other implementations, CN 405 doesn't wait for the confirmation, but sends the intercepted request to the AN 450 immediately after sending the ACR. In some other implementations, the AN 450 holds the request until it receives a matching ACR. However, implementations that skip AN's confirmation of received ACR may require more extensive testing to protect from corner cases (data losses, denial-of-service attacks etc.).

In some implementations, CN 405 may send the same ACR to the AN 450 multiple times, even if it wasn't recently received from the controller 440. For example, if AN 450 is programmed to delete CN's 405 ACR every time it drops a connection to the CN (for instance, due to network connection problems), CN 405 must re-send the ACR matching a currently intercepted request after starting a new connection to the AN 450. In this case, the request may not yet be on hold (CN 405 used previously obtained ACR). The CN 450 may put 575 the request on hold before sending the ACR to the AN 450. In other implementations, the CN 405 doesn't send ACR to the AN 450 after receiving it from the controller 440. Instead, the controller 440 sends the ACR to the AN 450 by itself, in addition to sending it to the CN 405.

In the illustrated implementation, only some of the intercepted requests are put on hold. In some embodiments, a request isn't put on hold if it matches a previously-obtained but still valid ACR which was already sent to the AN 450. In some implementations, the controller 440 provides the ACR containing the full list of protected resources, requiring only one request to be put on hold to obtain a valid ACR for any protected resource.

In some instances, the CN 405 doesn't obtain PRL(CN) at the beginning of the session but sends the request for the PRL after intercepting the first request or request not matching previously stored rules. In this case, the intercepted request may be put on hold until PRL(CN) is received. In some implementations, PRL(CN) is provided together with the ACR, or contains the ACR for the full list of protected resources.

In some implementations, the controller 440 provides an ACR containing a subset of protected resources, for instance, a group of domains frequently requested together, even if other resources can be requested without additional user authentication. To prevent performance degradation, the number of requests from the CN 405 to the controller 440 may be reduced if round-trip time (RTT) between the CN 405 and Controller 440 is comparable to or exceeds RTT between the CN 405 and the AN 450.

Figure 6:
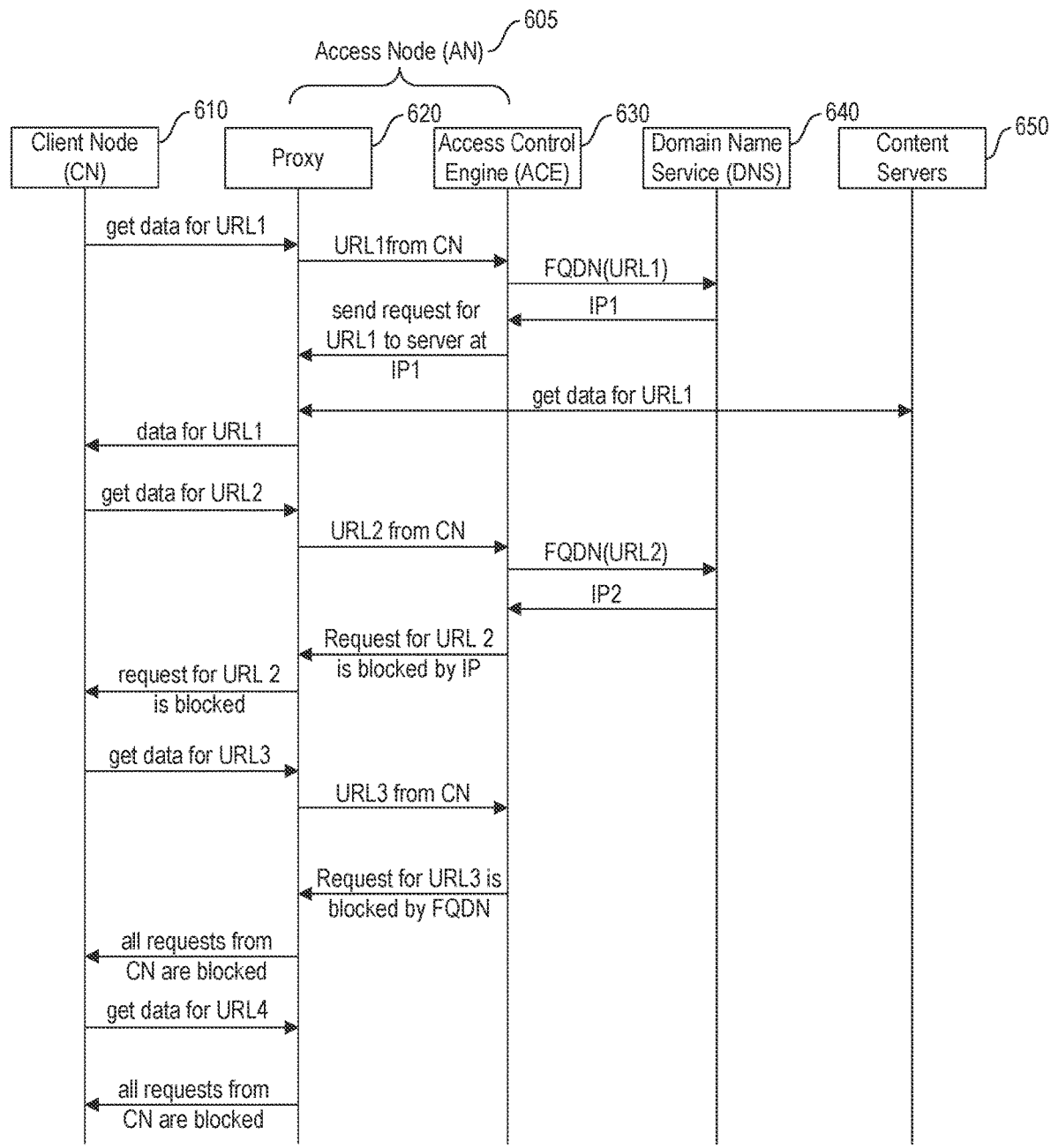
FIG. 6 is a sequence diagram depicting processing of the client's resource requests by the access node that includes resolving of the request's domain in accordance with an embodiment of the present invention.

FIG. 6 is a sequence diagram depicting processing of requests for protected resources issued by a CN 610 to the AN 605 that illustrates operations related to resolving of the request's domain name by the AN 605. The functions of the CN 610, AN 605, and a controller 440 may be incorporated into the CN 120, AN 165, and controller 100, respectively, as described above.

In the illustrated implementation, AN 605 contains a proxy 620 and an access control engine (ACE) 630. Proxy 620 is enabled to receive requests from that CN that were sent accordingly to the proxy protocol.

In some implementations, proxy 620 is any of a TCP proxy, UDP proxy and NetBios proxy. In other implementations, CN 610 sends packets to the AN 605 through a VPN tunnel (in this case, the CN 610 may lack a local proxy and/or not use proxy protocol to send these packets). In some instances of these implementations, AN 605 uses proxy 620 to terminate the connection from the CN 610 to determine the request's domain.

The ACE 630 may use an ACR to determine whether a received request is allowed to proceed. In some implementations, ACE 630 receives the ACR from the CN 610, which forwards the ACR from the controller (e.g., a controller in accordance with any of the controllers described herein). In other implementations, The ACE 630 receives the ACR directly from the controller. In both cases, the depicted sequences illustrate the cases where AN 605 is programmed to evaluate requests with the assumption that the CN 610, if not compromised, should apply the same rules as stored in the ACR available to the ACE 630 before issuing the request to the AN 605.

The ACE 630 may communicate with a Domain Name Service (DNS) 640 to resolve the request's domain name to an IP address. In some implementations, DNS 640 resides on a computer different from the one executing the AN 604. For instance, the AN 605 may reside on a computer inside a local network, while DNS 640 resides on a router connected to the local network. In other implementations DNS 640 resides on the same computer as the AN 605. In some instances, the proxy 620 and ACE 630 are merged into a single module.

In the illustrated implementation, the proxy 620 may terminate the request from the CN 610 that references URL1 and passes one or more request parameters from the request, including URL1, to the ACE 630. The ACE 630 may compare one or more request parameters to the ACR to determine if the request is allowed to proceed. If the request is allowed to proceed, the ACE 630 may extract a Fully Qualified Domain Name (FQDN) from URL1 and request the DNS 640 to resolve the FQDN to an IP address. Upon receiving the IP address, the ACE 630 may use the ACR to again check if the request is allowed to proceed and, if the answer is yes, ACE 630 may instruct the proxy 620 to send the request to the content server referenced by IP1 from a group of content servers 650 accessible over the Internet. After the content server returns the requested data, proxy passes the response to the CN 610.

The first sequence in the illustrated implementation illustrates the case where both URL1 and IP1 are allowed to proceed by the one or more rules of the ACR available to the AN 605.

The second sequence in the depicted implementation starts with CN 610 issuing a request associated with, e.g., including, URL2, and illustrates the case where URL2 is allowed to proceed according to the ACR available to the AN 605, but IP2, obtained by resolving FQDN(URL2) using DNS 640, is not allowed to proceed according to the ACR available to the AN 605. In this case, ACE 630 informs the proxy 620 that the request for URL2 is blocked according to the IP address. In response, the proxy 620 doesn't send the request to one of the content servers 650 referenced by the IP address, but rather notifies the CN 610 that the request was blocked. After blocking the request based on its IP address, AN 605 continues to process subsequent requests from the CN 605, In particular, even if the request was blocked according to the same ACR that was used by the CN 605 to decide whether to send the request, the CN 605 did not have access to the blocked IP address when the request was issued and therefore would not have detected that the IP address should be blocked according to the ACR. For instance, FQDN(URL2) may point to a resource on the local network with a local IP address that could only be resolved by issuing the request from a device inside the same local network, such as the AN 605.

The third sequence in the illustrated implementation starts with CN 610 issuing a request associated with, e.g., including, URL3, and illustrates the case when URL3 is not allowed to proceed by the ACR based on provided request parameters, for instance, after comparing FQDN(URL3) with the one or more ACR rules. In response, ACE 630 notifies proxy 620 that the request is blocked per the ACR rules according to the FQDN without requesting the DNS 640 to resolve the IP address of the FQDN. In response, proxy 620 may block all subsequent requests from the CN 610, such as at least until a new ACR is obtained. This may be the case because an uncompromised CN 610 should have known according to the ACR that the FQDN of the request should be blocked.

In other implementations, the AN 605 may not receive a full URL of the request, for instance if the CN 610 issues the request using HTTPS protocol. In some of these implementations, the AN 605 may obtain the FQDN of the request from a Service Name Indicator (SNI) provided with HTTPS request. In other implementations the AN 605 obtains the FQDN from a CONNECT header sent by the CN 610 according to the proxy protocol.

As is apparent, the embodiment of FIG. 6 may include repeated application by the AN 605 of the same ACR to the same request, with different consequences if the request was blocked on the first pass (subsequent requests blocked) or on the subsequent pass (subsequent requests not blocked). If the AN 605 blocks the request based on the parameters provided when the request is sent by the CN 610 (such as based on FQDN), the AN 605 stops accepting all subsequent requests because a correctly functioning CN 610 should block this request using the same ACR rules instead of issuing it to the AN 605. If the AN 605 blocks the request based on different parameters that may not be known to the CN 610 when it issued the request, such as an IP address that wasn't provided by CN 610 with the request, AN 605 continues to process subsequent requests from the CN 610. In another example, the DNS 640 may respond not with an IP address (A record or AAAA record), but with redirection to a different domain (e.g., CNAME record). The CN 610 may not have a record of the different domain when the request was issued, and AN 605 would continue to process subsequent requests after blocking the request based on the different domain received from the DNS 640. In yet another example of the same aspect, the AN 605 may receive a request from the CN 610 including an IP address. The CN 610 may then perform a reverse-DNS lookup to determine a corresponding domain. If the AN 605 blocks this domain, it may continue to accept subsequent requests from the CN 610.

Figure 7:
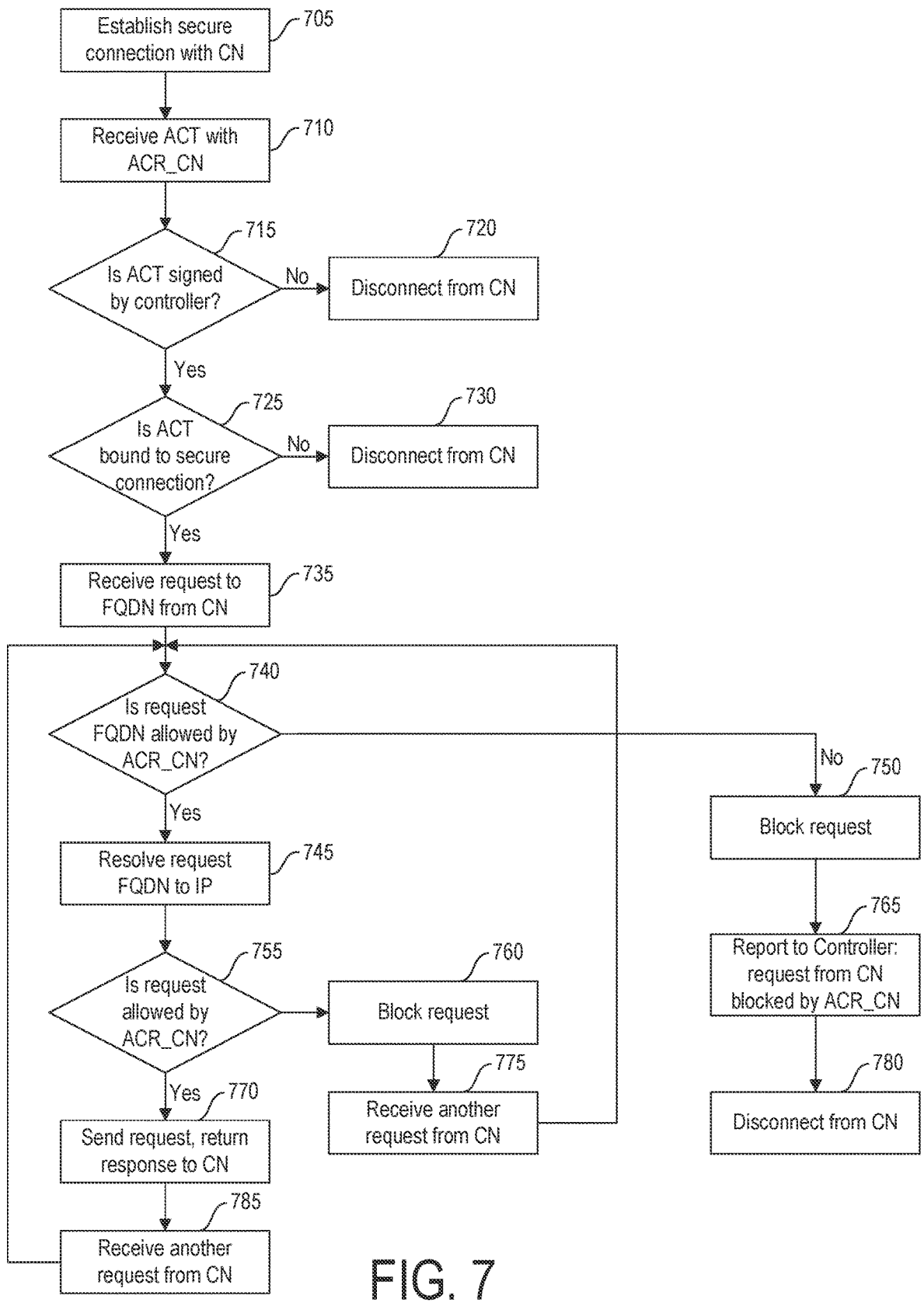
FIG. 7 is a process flow diagram of a method for processing of the client's resource requests by the access node that includes resolving of the request's domain in accordance with an embodiment of the present invention.

FIG. 7 illustrates a process flow diagram of a method for processing of the client's resource requests by the access node (AN), such as an AN 605. The processing of the client's resource requests may include resolving of the request's domain.

In the illustrated implementation, the AN 605 establishes 705 a secure connection with a CN 610 and then receives 710 an ACT containing ACR_CN, forwarded by the CN610 after the CN 610 has received the ACT from a controller, such as a controller 100 as described herein. The AN 605 may check 715 whether the ACT is valid (for instance, whether the ACT is signed or encrypted by the controller), and, if not, disconnects 720 from the CN 610. In other implementations, the AN 605 may receive the ACR_CN directly from the controller.

In the illustrated implementation, the AN 605 also checks 725 whether the ACT is cryptographically bound to a secure connection, and, if not, disconnects 730 from the CN 610. To make the ACT cryptographically bound to the secure connection between the CN 610 and the AN 605, the CN 610 may request that the controller provide the ACT containing the ACR_CN after establishing a secure connection (e.g., TLS connection 125) to the AN 605, while providing a value derived from the keying material of the TLS connection 125 (for instance, "handshake finished" message, known to both the AN 605 and the CN 605). The controller 105 may include this value in the ACT signed or encrypted by the controller's private key. The AN 605 may verify that the included value corresponds to the keying material available on the AN 605. This implementation hinders exfiltration of the ACT and its reuse by another client. In some instances, the TLS connection between the CN 610 and the AN 605 is resumed by using TLS session resumption protocol, in order to reuse the same ACT if the CN 610 reconnects over a different network, or after short network interruptions. In some implementations, the ACT also includes the CN's 610 public key and the CN 610 sends an Authentication Token (AT) to the AN 605, such as described above with reference to FIG. 1.

After the AN 605 obtains ACR_CN from the valid ACT, it may receive 735 a request for a protected resource referring to an FQDN and then check 740 if the request's FQDN is allowed according to ACR_CN. If the request is not allowed, the AN 605 blocks 750 the request and reports 765 to the controller that the request was blocked according to a parameter submitted with the request (FQDN) and then disconnects 780 from the CN 610 and/or takes other actions to stop allowing subsequent requests from the CN 610. If the TLS is using session resumption, the AN 605 may also remove session resumption information to force the CN 610 to generate new keying material for the next connection.

In the illustrated implementation, the CN 610 may be required to provide a new ACT for every connection with the AN 605 that doesn't use TLS session resumption. By dropping the connection to the CN 610 and, if needed, removing session resumption data, the AN 605 may force the CN 610 to request a new ACT from the controller before sending the next request. The controller, after receiving the AN's report that the request from the CN 610 was blocked according to the FQDN submitted with the request (and, therefore, should have been blocked by a correctly functioning CN), may downgrade access of a user of the CN 610 (for instance, move the CN's 610 user to the "untrusted" group). Accordingly, the ACR_CN subsequently provided by the controller to the CN 610 and AN 605 may allow access to a smaller group of resources. In other implementations, the AN 605 informs the CN 610 that it will need a new ACT before accepting the next request but doesn't drop the connection with the CN 610.

If the request's FQDN is allowed according to ACR_CN, the AN 605 may resolve 745 the FQDN to an IP address and check 755 whether the IP address is allowed according to the same ACR_CN. In other implementations, the AN 605 checks whether request's IP is allowed according to a different set of rules, for instance, by checking an ACR received directly from the controller. In some other implementations, the AN 605 receives redirection to a different FQDN (e.g., CNAME DNS response) and checks the different FQDN against ACR_CN. If, after checking request's IP or domain returned by a resolver, the AN 605 determines that request shouldn't be allowed according to ACR_CN (or the different set of rules), the AN 605 blocks 760 the request but doesn't disconnect from the CN 610 and remains ready to receive 775 another request. In this case, the AN 605 doesn't force CN 610 to provide another ACT because the CN 610 may not know that request was resolved to the IP address or the domain blocked according to ACR_CN. For instance, the AN 705, but not the CN 610, may be able to resolve FQDN to the IP address in the same local network, or CN 610 would obtain a different IP address if it had tried to resolve the request's FQDN from a remote location, i.e. outside the local network.

If the request's IP address is also allowed to proceed, the AN 605 may send 720 the request to the content server referenced by the request, and receive a response from the content server. The AN 605 returns the response to CN 610, and remains ready to receive 785 another request from CN over the same secure connection.

Figure 8:
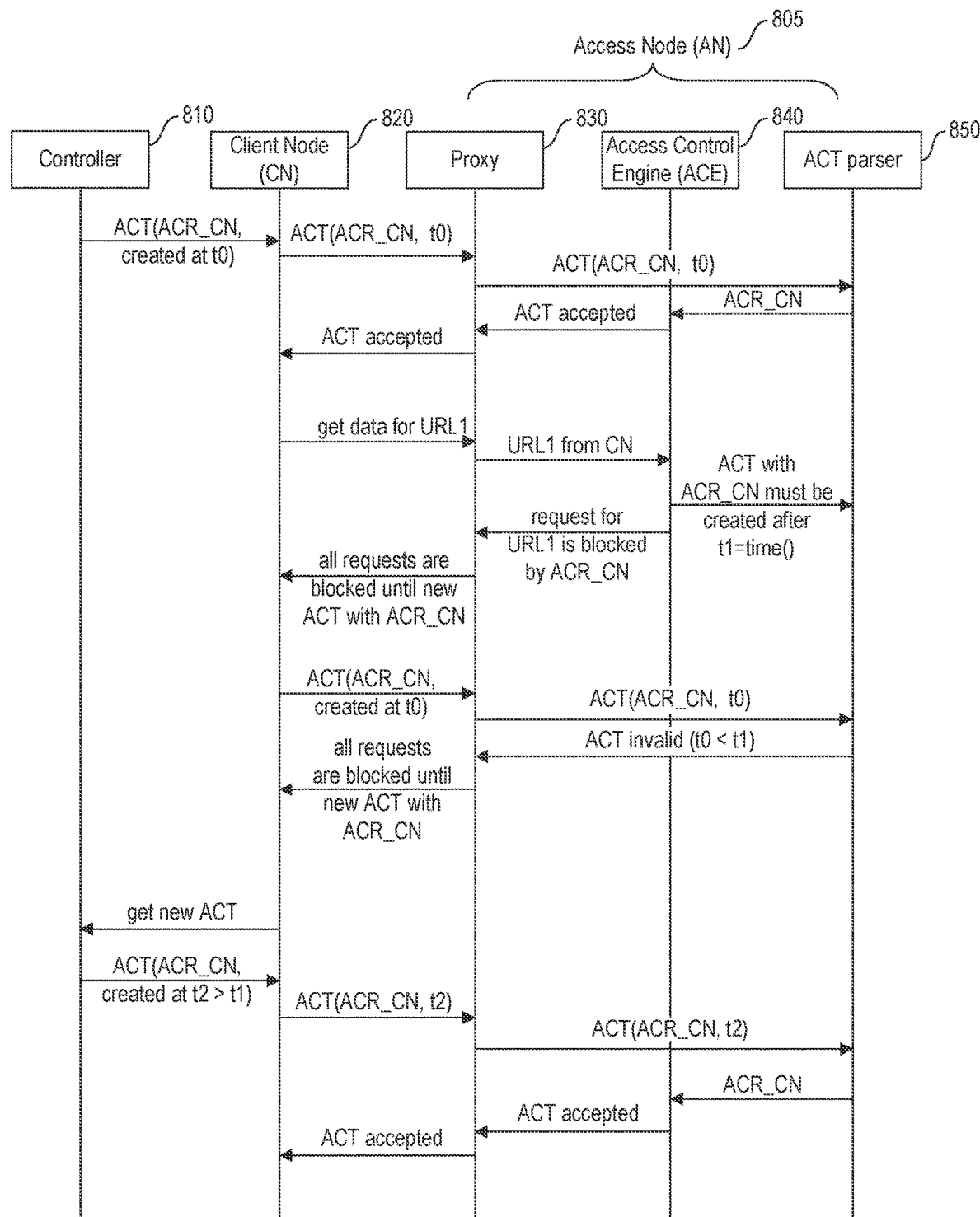
FIG. 8 is a sequence diagram depicting processing of the client's resource requests by the access node that includes invalidation of the rule set in accordance with an embodiment of the present invention.

FIG. 8 is a sequence diagram illustrating processing of a resource request issued from the CN 820 to the AN 805 and that illustrates validation of a new ACR_CN after the AN 805 stopped accepting CN's requests, such as in response to a blocked request that the CN 820 should have blocked as determined according to any of the embodiments described above. The functions of the AN 805, CN 820, a controller 810 may be incorporated into an AN 165, CN 120, and controller 100, respectively, according to any of the embodiments disclosed herein.

In the illustrated implementation, the CN 820 receives an ACT containing the new ACR_CN from the controller, such as the controller 100. The ACR_CN may be cryptographically signed or encrypted by an entity with a known public key, such as the controller. The ACT may also contain at least one value derived from a time it was created, signed, encrypted, or sent to the CN 820. In the description below this value is referred to as "issue time." In some implementations, that ACT may also contain an expiration time.

After receiving the ACT and extracting ACR, the CN 820 may forward the ACT to the AN 805. In the illustrated implementation, the AN 805 may include a proxy 830, access control engine (ACE) 840, and an ACT parser 850. The proxy 830 may receive the ACT from the CN 820 and send the ACT to the parser 850. The parser 850 may validate the ACT, extract the ACR_CN from valid ACT, and send the ACR_CN to the ACE 840. The ACE 840 may notify the proxy 830 that the ACT is accepted if the validation is successful. In response to the notification, the proxy 830 may send confirmation of the validation to the CN 820.

After receiving confirmation that the ACT containing ACR_CN is accepted, the CN 820 may send a request for a protected resource referenced by URL1. The depicted sequence illustrates the case where the ACE 840 blocks the request after matching information provided with the request, for instance, a FQDN derived from URL1, with the ACR_CN previously obtained from the CN 820. The ACE 840 notifies the proxy 830 that the request is blocked according to the ACR_CN. In response, the proxy 830 stops accepting subsequent requests from the CN 820 while also informing the CN 820 that it should request a new ACR_CN from the controller. As described above, this action may be taken because a correctly functioning CN was expected to block the request after applying its own copy of ACR_CN, instead of sending it to the AN 805. In the illustrated implementation, the ACE 840 also informs the ACT parser 850 that the request was blocked according to ACR_CN. The parser 850 may store a time t1, which is equal to or later than the time when the request was blocked according to ACR_CN. The parser 850 may use the stored time t1 during ACT validation process. For example, an ACT may be validated only if issued after t1 (e.g., has an issue time after t1). In some implementations, the AN 805 notifies the controller that CN's 820 request was blocked according to ACR_CN and stores the time t1 equal to or later than when it receives the controller's confirmation of receipt of the notification. This may ensure that the controller has notification of the blocked request and therefore is aware that the CN 820 is functioning incorrectly before the CN 820 asks for another ACT.

The illustrated implementation also illustrates the case when, after the request was blocked, the CN 820 attempts to resend the old ACT with the ACR_CN, containing issue time t0 prior to the time when the request was blocked. After receiving this ACT from the proxy 830, the ACT parser 850 recognizes the ACT as invalid in response to determining t0<t1. The parser 850 notifies the proxy 830 that the ACT is invalid and, in response, the proxy 830 continues to block all subsequent requests from the CN 820 until another ACT is submitted by the CN 820 and validated by the parser 850.

Only after CN 820 requests the controller to provide a new ACT, the CN 820 obtains a new ACT with issue time t2 after t1, and forwards the new ACT to the AN 805 will the ACT parser 850 recognizes it as valid (if t2>t1) and instruct the proxy 830 to start accepting subsequent requests from the CN 820. If the controller 810 has determined to limit the CN's 820 access to protected resources after receiving the notification of the blocked request from the AN 805, the new ACR_CN provided with the new ACT may contain more limited set of resources (for instance, only resources available for "untrusted" group of users). In some implementations, the controller requests that a user of the CN 820 provide additional authentication, such as multi-factor authentication and provides a new ACT only after the additional authentication is received from the CN 820. In other implementations, the controller 810 stops providing ACT to the device that issued the blocked request until directly allowed by an administrator of the controller 810.

In other embodiments, at least some of the proxy 830, ACE 840 and ACT parser 850 may be merged into the same module of the AN 805. In some implementations, the controller 810, while providing the new ACT issue time, only includes a partial ACR_CN with the new ACT, or only confirms that an old ACR_CN can be used after the new issue time. In some implementations, the AN 805 receives ACR_CN directly from the controller 810, instead of receiving it as a part of ACT forwarded by the CN 820. In some instances of these implementations, the AN 805 compares a time when it received a new ACR_CN from the controller 810 with the time when the AN 805 blocked the request according to a former ACR_CN. In some instances of these implementations, the AN 805 doesn't store the time when the request was blocked, but just invalidates ACR_CN until it receives a new ACR_CN from the controller 810.

As is apparent, the approach of FIG. 8 may impose a requirement that both CN 820 and AN 805 receive a new set of rules from the controller after AN 805 blocks the CN's request, if that request shouldn't have been issued by the CN 820 that uses the rules known to AN (ACR_CN). In some implementations, the AN 805 enforces this requirement by comparing the time when controller 810 issued the ACR_CN with the time when the AN 805 blocked the request (requests received after the issue time should be blocked and should not have been issued by the CN 820 according to the ACR_CN).

Figure 9A:
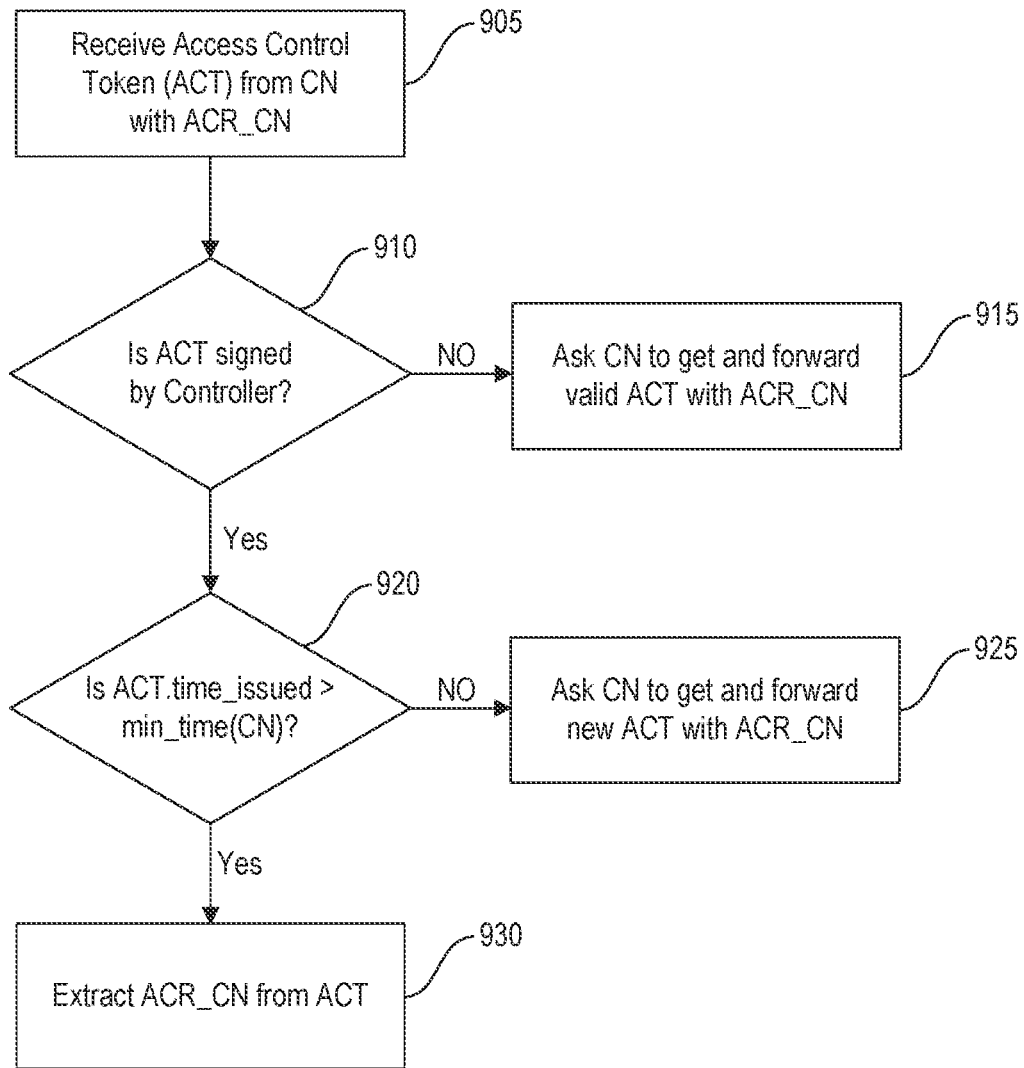
FIGS. 9a and 9b are process flow diagrams of a method for processing of the client's resource requests by the access node that includes invalidation of the rule set in accordance with an embodiment of the present invention.
Figure 9B:
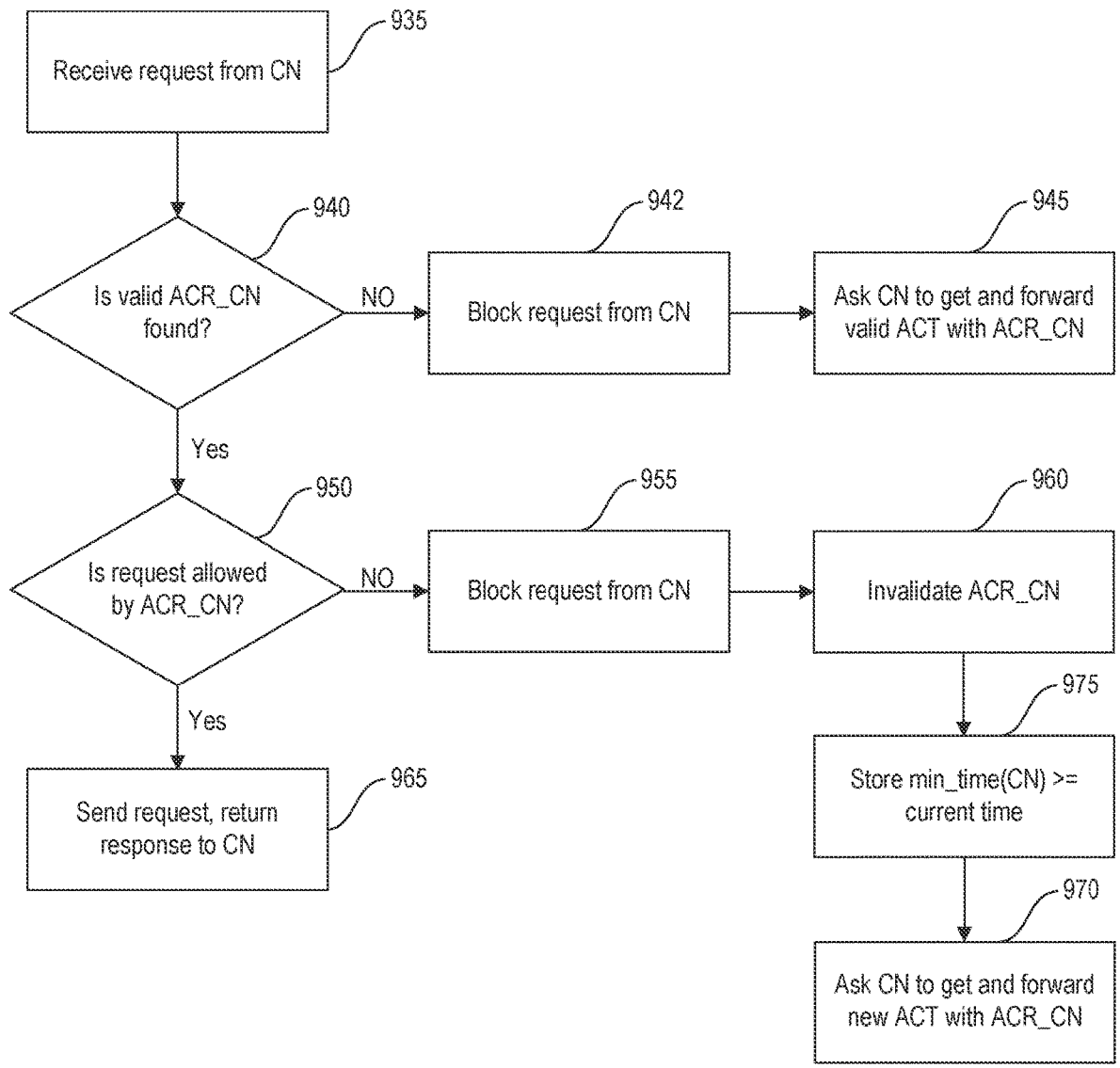

This feature may be further understood with reference to FIGS. 9A and 9B, which are process flow diagrams of a method for processing CN resource requests by the AN 805, including validation of the ACR.

FIG. 9A illustrates a process of validation of a CN-specific ACR (ACR_CN in FIG. 9A) performed by the AN 805. In the illustrated implementation, AN 805 receives 905, from CN 820, an ACT containing at least ACR_CN and the time when ACT was issued. The AN 805 receives the ACT from the CN 820, which obtains the ACT from the controller 810, extracts its own copy of ACR_CN, and then forwards the ACT to the AN 805. The AN 805 checks 910 if the ACT is signed or encrypted by the private key corresponding to a known public key, such as the public key of the controller 810. If AN can't find the cryptographic proof that ACT was issued by the controller 810, it rejects the ACT and requests 915 the CN 820 to provide a new ACR_CN.

If the ACT is recognized as issued by the controller 810, the AN 805 may check 920 whether the time when the ACT was issued (ACT.time_issued) is after an earliest allowed time for that CN 820 (min_time(CN)). In some implementations, min_time(CN) is stored only after AN determines that it requires another ACR_CN before processing subsequent requests from that CN 820, such as in response to a blocked request that should not have been sent according to a previous ACR_CN. In some instances of these implementations, the ACT is considered valid if min_time(CN) isn't stored, or is smaller than ACT.time_issued. If min_time(CN) is stored and is larger than ACT.time_issued, the AN 805 considers ACT invalid and requests 925 the CN 820 to obtain and provide a valid ACR_CN. If the ACT is recognized as valid after the check 920, the AN 805 extracts the ACR_CN and prepares to apply it to requests for protected resources from the CN.

In other implementations, instead of containing time_issued, ACT contains another time-derived value, for instance a time when the CN 820 had asked for the new ACR, as long as this value is sufficient to assure that the new ACR was issued after the AN 805 has stopped using a previous ACR_CN.

In the illustrated implementation, the AN 805 may stop using a previous ACR_CN for CN 820 after a request from the CN 820 is blocked according to the one or more rules that should also be known to the CN 820. In other implementations, the AN 805 stops accepting a previous ACR_CN after receiving a command to do so from the controller 810. The controller 810 may issue this command, for instance, after the change of the access group or role for a user of the CN 820, to add new resources available through the AN 805, or to force the CN 820 to update to a latest version of the ACR_CN. In some other implementations, the AN 805 stops accepting a previous ACR_CN after detecting a security threat such as an abnormally high number of requests from the CN 820, e.g., a number of requests per unit time in a time window that is greater than a threshold amount above an average number of requests per unit time from that CN 820 over a larger time window, such as a lifetime of a session of the CN 820 with the AN 805.

In some implementations, instead of providing a single ACT with ACR_CN, the controller 810 uses a different token format, or provides tokens containing references to the data instead of the data itself. For instance, a signed ACT may contain a hash of a separately provided ACR_CN and the time when this ACR_CN was confirmed to be valid. The AN 805 may validate the separate ACR_CN using the signed ACT.

FIG. 9B illustrates a process of invalidation of the CN-specific ACR_CN performed by the AN 805 after it blocks a request that should not have been issued by a correctly working CN 820. In the illustrated implementation, the AN 805 receives 935 a request from the CN 820 and then checks 940 if it already has a valid ACR_CN containing one or more rules matching this request. If such an ACR isn't found, the AN 805 blocks 942 the request and requests 945 that the CN 820 obtain a valid ACR (ACR_CN) and forward the valid ACR_CN to the AN 805, for instance as part of an ACT signed or encrypted by the controller 810. If a valid ACR_CN for the CN 820 is present on the AN 805, AN 805 applies the ACR_CN to check 950 whether the CN 820 request is allowed. If the request is allowed, the AN 805 sends 965 the request to a protected resource referenced by the request, receives a response from the protected resource, and returns the response to the CN 820. If the request is not allowed according to the ACR_CN, the AN 805 blocks 955 the request and may invalidate 960 the ACR_CN, which causes all subsequent requests to be blocked after the check 940. The AN 805 may request 970 that the CN 820 obtain and forward a valid ACR_CN before AN 805 can start accepting other requests for protected resources from the CN 820. To make sure that a new ACR_CN is issued by the Controller after the AN 805 blocked the suspicious request, the AN 805 may store 975 min time(CN) (e.g., a time on or after the AN blocked the request), which may be used to validate the next ACR_CN as discussed above with respect to FIG. 9A.

In some implementations, instead of asking the CN 820 to provide a new ACR_CN, the AN 805 drops the connection to the CN 820 and deletes all ACRs associated with the CN 820. The CN 820 may therefore be required to forward anew ACR_CN after establishing new connection with the AN 805.

Figure 10:
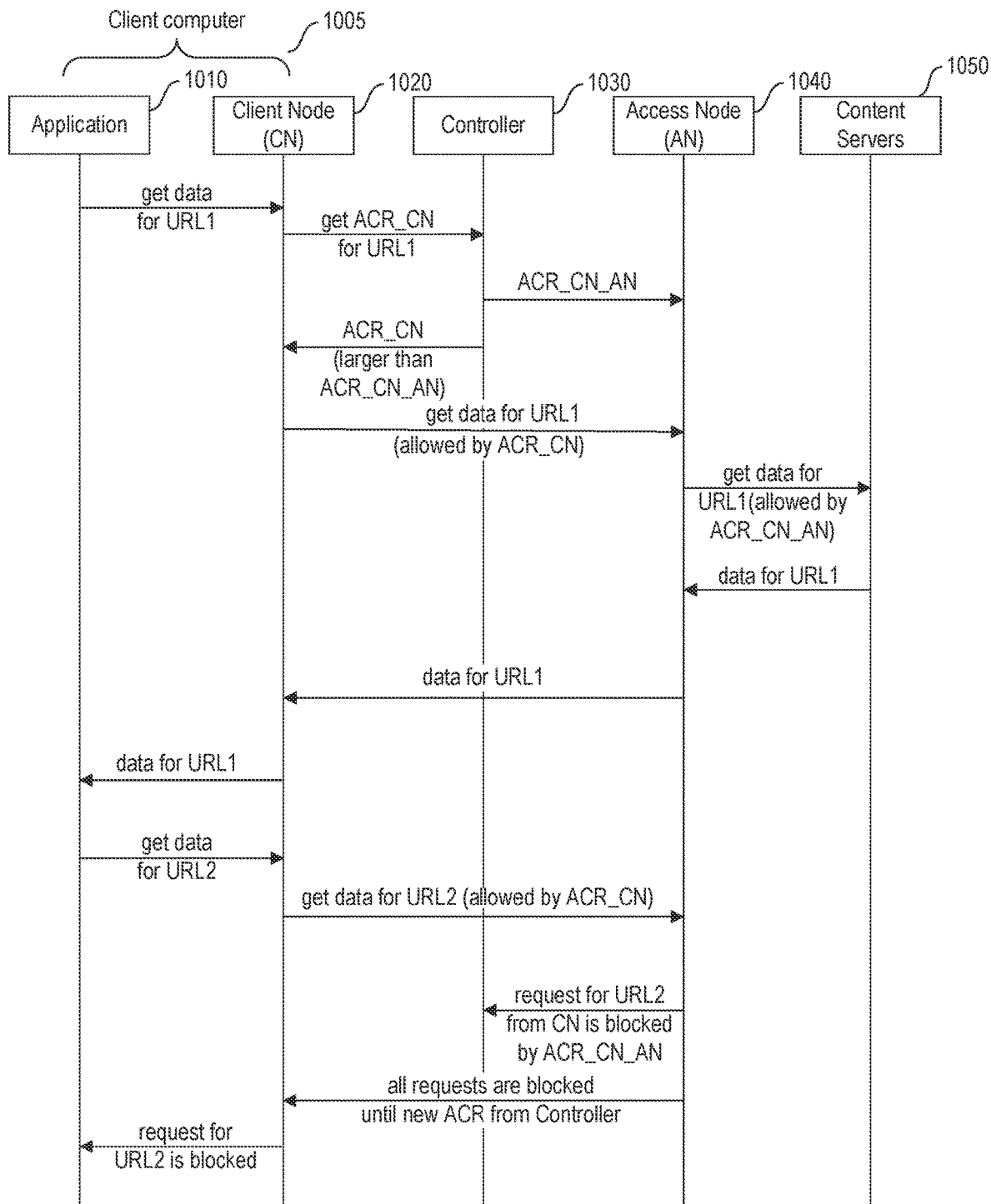
FIG. 10 is a sequence diagram depicting distribution of the rule sets from the controller to the client node and the access node and their use in detection of the client's request indicating a security threat in accordance with an embodiment of the present invention.

FIG. 10 is a sequence diagram illustrating distribution of the rule sets ACR_CN from the controller 1030 to a CN 1020 and an AN 1040 and detection of CN's 1020 request indicating a security threat. The CN 1020, controller 1030, and AN 1040 may be incorporated into a CN 120, controller 100, and AN 165 according to any of the embodiments disclosed herein In the illustrated implementation, the CN 1020 intercepts a request for a protected resource referenced by URL1 from application 1010, the application 1010 residing on the same client computer 1005 as the CN 1020. The CN 1020 requests the controller 1030 for ACR_CN, i.e. a set of rules to determine whether requests should be allowed. In some instances, the CN 1020 asks for ACR_CN only upon determining that a request from application 1010 is for a protected resource (for instance, matches a PRL with which the CN 1020 is configured). The controller 1030 responds to the request by sending two sets of rules: ACR_CN to CN 1020, ACR_CN AN to AN 1040.

In the illustrated implementation, all resource requests allowed according to ACR_CN AN rules are also allowed according to ACR_CN, but some resource requests allowed according to ACR_CN are not allowed according to ACR_CN AN. In the first illustrated sequence, a request for the resource referenced by URL1 is allowed according to both ACR_CN and ACR_CN AN. In response, AN 1040 sends the request to the corresponding content server 1050 referenced by the request and forwards a response from the content server 1050 to the request back to the CN 1020. In the second illustrated sequence, a request for a resource referenced by URL2 is allowed according to ACR_CN, but blocked according to ACR_CN AN, which causes the AN 1040 to block all requests from the CN 1020 until it requests a new ACR_CN, resulting in the new ACR_CN AN arriving from the controller 1030. In some instances, AN 1040 also notifies the controller 1030 that, because it blocked the request from the CN 1020, the CN 1020 may indicate a security risk.

In the implementations described in reference to FIGS. 1, 2, and 4-9, the AN blocks all subsequent requests from CN if it determines that a correctly functioning CN should prevent a previously-received request from being issued. In the implementations described in reference to FIGS. 3 and 10, the AN blocks all subsequent requests even if the CN's ACR_CN allows the CN to issue one or more requests blocked by the AN.

In some implementations, full contents of ACR_CN are not disclosed to the application issuing a request intercepted by CN, or to the CN's user. In some instances, the user is expected to obtain a list of resources available through the AN from other sources (for example, from admin's email, or from the prior interactions with the same resource). In other instances, CN provides to its users a partial list of protected resources, which doesn't include resources that would be blocked according to ACR_CN AN.

In some implementations, resource patterns allowed according to ACR_CN but blocked according to ACR_CN AN make it highly improbable for the CN's user to issue a request for such resource without extracting it from ACR_CN, if full ACR_CN isn't disclosed during normal operations. A full ACR_CN can be extracted, for instance, by deploying a compromised CN, or by accessing the CN's working memory. Any such activity could be an indication of security threat. In some instances, resource request patterns allowed according to ACR_CN but blocked according to ACR_CN AN are domains associated with invalid resources: for example, invalid domain.com that can't be resolved by DNS, or invalid subdomain.real domain.com that can be resolved but doesn't point to the real content. In other instances, resource request patterns allowed according to ACR_CN but blocked according to ACR_CN AN are domains associated with valid but obscure or misleading resources: for instance, honeypot domain that provides decoy content.

In some implementations, resource patterns allowed according to ACR_CN but blocked according to ACR_CN AN are included to indicate an attempt of an unauthorized scan of the network protected by the AN, but without allowing most of the scan requests to reach the AN. In some instances, such resource patterns are one or more local IP addresses of the protected network. A network scan that pings multiple local IPs inside the same range, for instance between 172.168.1.0 and 172.168.1.255, would have most of these requests blocked according to ACR_CN. However, if ACR_CN allows requests to a few IP addresses that should not be accessed by user issuing a request for known resource, blocking of such requests by ACR_CN AN would indicate unauthorized network scan. In these implementations, AN is protected from being overloaded by the large number of requests but remains capable of detecting a security threat.

Figure 11:
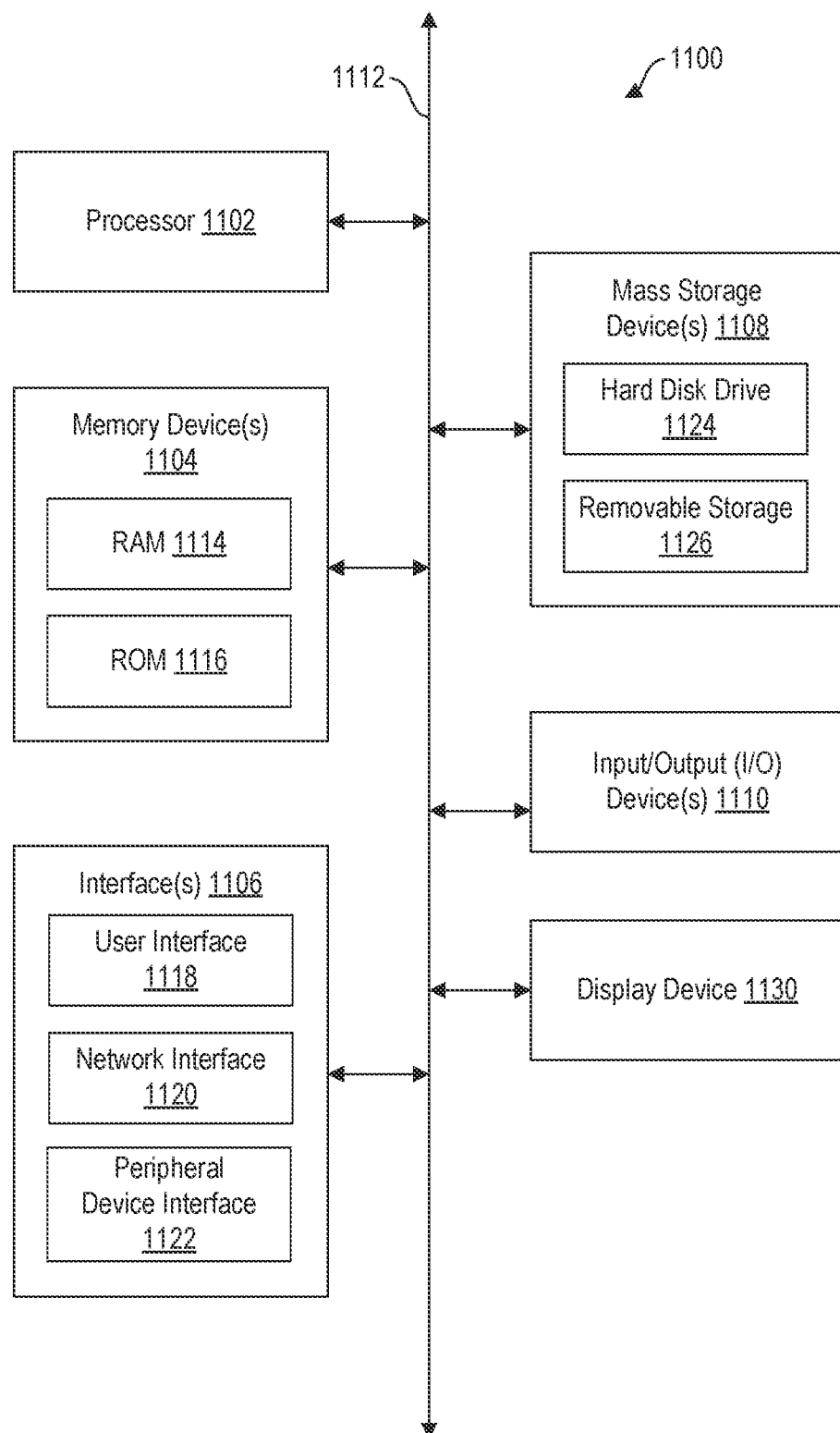
FIG. 11 is a schematic block diagram of a computing device that may be used to implement the systems and methods described herein.

FIG. 11 illustrates an example computing device 1100 that may be used to implement a CN, AN, controller, relay, or other computing devices described above. In particular, components described above as being a computer or a computing device may have some or all of the attributes of the computing device 1100 of FIG. 11. FIG. 11 is a block diagram illustrating an example computing device 1100 which can be used to implement the systems and methods disclosed herein Computing device 1100 includes one or more processor(s) 1102, one or more memory device(s) 1104, one or more interface(s) 1106, one or more mass storage device(s) 1108, one or more Input/Output (I/O) device(s) 1110, and a display device 1130 all of which are coupled to a bus 1112. Processor(s) 1102 include one or more processors or controllers that execute instructions stored in memory device(s) 1104 and/or mass storage device(s) 1108. Processor(s) 1102 may also include various types of computer-readable media, such as cache memory.

Memory device(s) 1104 include various computer-readable media, such as volatile memory (e.g., random access memory (RAM) 1114) and/or nonvolatile memory (e.g., read-only memory (ROM) 1116). Memory device(s) 1104 may also include rewritable ROM, such as Flash memory.

Mass storage device(s) 1108 include various computer readable media, such as magnetic tapes, magnetic disks, optical disks, solid-state memory (e.g., Flash memory), and so forth. As shown in FIG. 11, a particular mass storage device is a hard disk drive 1124. Various drives may also be included in mass storage device(s) 1108 to enable reading from and/or writing to the various computer readable media. Mass storage device(s) 1108 include removable media 1126 and/or non-removable media.

I/O device(s) 1110 include various devices that allow data and/or other information to be input to or retrieved from computing device 1100. Example I/O device(s) 1110 include cursor control devices, keyboards, keypads, microphones, monitors or other display devices, speakers, printers, network interface cards, modems, lenses, CCDs or other image capture devices, and the like.

Display device 1130 includes any type of device capable of displaying information to one or more users of computing device 1100. Examples of display device 1130 include a monitor, display terminal, video projection device, and the like.

Interface(s) 1106 include various interfaces that allow computing device 1100 to interact with other systems, devices, or computing environments. Example interface(s) 1106 include any number of different network interfaces 1120, such as interfaces to local area networks (LANs), wide area networks (WANs), wireless networks, and the Internet. Other interface(s) include user interface 1118 and peripheral device interface 1122. The interface(s) 1106 may also include one or more user interface elements 1118. The interface(s) 1106 may also include one or more peripheral interfaces such as interfaces for printers, pointing devices (mice, track pad, etc.), keyboards, and the like.

Bus 1112 allows processor(s) 1102, memory device(s) 1104, interface(s) 1106, mass storage device(s) 1108, and I/O device(s) 1110 to communicate with one another, as well as other devices or components coupled to bus 1112. Bus 1112 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1100, and are executed by processor(s) 1102. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

In the above disclosure, reference has been made to the accompanying drawings, which form a part hereof, and in which is shown by way of illustration specific implementations in which the disclosure may be practiced. It is understood that other implementations may be utilized and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Implementations of the systems, devices, and methods disclosed herein may comprise or utilize a special purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, an in-dash vehicle computer, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It should be noted that the sensor embodiments discussed above may comprise computer hardware, software, firmware, or any combination thereof to perform at least a portion of their functions. For example, a sensor may include computer code configured to be executed in one or more processors, and may include hardware logic/electrical circuitry controlled by the computer code. These example devices are provided herein purposes of illustration, and are not intended to be limiting. Embodiments of the present disclosure may be implemented in further types of devices, as would be known to persons skilled in the relevant art(s).

At least some embodiments of the disclosure have been directed to computer program products comprising such logic (e.g., in the form of software) stored on any computer useable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the disclosure. Thus, the breadth and scope of the present disclosure should not be limited by any of the above-described exemplary embodiments, but should be defined only in accordance with the following claims and their equivalents.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

The invention claimed is:

1. A system for managing access comprising:
a first computer connected to a network and configured to control access to a protected resource, the first computer comprising one or more processing devices and one or more memory devices operably coupled to the one or more processing devices, the one or more memory devices storing executable code, that, when executed by the one or more processing devices, causes the one or more processing devices to:
obtain one or more rules formulated to determine whether one or more resource requests should be sent from the first computer to a second computer;
intercept, by a module on the first computer, a first resource request;
apply the one or more rules to the first resource request;
if the first resource request is allowed according to the one or more rules:
  (a) send the one or more rules to the second computer; and
  after performing (a), (b) send the first resource request to the second computer;
wherein the executable code, when executed by the one or more processing devices, further causes the one or more processing devices to:
obtain the one or more rules by:
  (c) after intercepting the first resource request, holding the first resource request on the first computer; and
  while performing (c):
    sending a second request to a third computer for the one or more rules; and
    receiving a response to the second request from the third computer, the response including the one or more rules;
apply the one or more rules contained in the response from the third computer to the first resource request; and
if the first resource request should be sent to the second computer according to the one or more rules, send at least part of the response received from the third computer to the second computer before sending the first resource request to the second computer.

2. The system of claim 1, wherein the executable code, when executed by the one or more processing devices, further causes the one or more processing devices to:
  (c) after intercepting the first resource request, hold the first resource request on the first computer;
  perform (a) after performing (c);
  (d) continue performing (c) until receiving a response to (a) from the second computer; and
  perform (b) after performing (d).

3. The system of claim 2, wherein the executable code, when executed by the one or more processing devices, further causes the one or more processing devices to:
  perform (c) by temporarily storing at least part of the first resource request without sending the first resource request to the second computer; and
  after performing (b), delete the temporarily stored at least part of the first resource request.

4. The system of claim 1, wherein the executable code, when executed by the one or more processing devices, further causes the one or more processing devices to:

send the second request to the third computer by including at least part of the first resource request in the second request.

5. The system of claim 1, wherein the executable code, when executed by the one or more processing devices, further causes the one or more processing devices to:
receive the response from the third computer by receiving a token containing the one or more rules, the token being cryptographically bound to a trusted identity; and
send the one or more rules to the second computer by sending the token to the second computer.

6. The system of claim 5, wherein the token is a JavaScript Web Token containing a cryptographic signature.

7. The system of claim 5, wherein the executable code, when executed by the one or more processing devices, further causes the one or more processing devices to:
send the first resource request to the second computer only after verifying validity of the token.

8. The system of claim 1, wherein the executable code, when executed by the one or more processing devices, further causes the one or more processing devices to:
store the one or more rules obtained from the response;
intercept a third resource request;
apply the stored one or more rules to the third resource request; and
if the third resource request should be sent to the second computer according to the stored one or more rules, send the third resource request to the second computer without sending the one or more rules to the second computer after the third resource request was intercepted.

9. The system of claim 1, wherein the executable code, when executed by the one or more processing devices, further causes the one or more processing devices to:
intercept the first resource request by using a proxy on the first computer to terminate the first resource request and generate a new request, wherein the proxy is selected from the group consisting of a transport control protocol (TCP) proxy, a user datagram protocol (UDP) proxy, and a NetBios proxy.

10. The system of claim 9, wherein the executable code, when executed by the one or more processing devices, further causes the one or more processing devices to:
hold the first resource request by delaying generation of the new request while obtaining, by the proxy on the first computer, the one or more rules.

11. The system of claim 9, wherein the proxy is a transparent proxy.

12. A system for managing access comprising:
a first computer connected to a network and configured to control access to a protected resource, the first computer comprising one or more processing devices and one or more memory devices operably coupled to the one or more processing devices, the one or more memory devices storing executable code, that, when executed by the one or more processing devices, causes the one or more processing devices to:
obtain a first rule set containing one or more rules formulated to determine whether one or more intercepted resource requests are for a protected resource;
intercept a first request of the one or more intercepted resource requests from a second computer; and
if the first request matches one or more rules in the first rule set perform in order:
holding the first request on the first computer;
sending a request to a third computer for a second rule set including one or more rules formulated to determine whether the one or more intercepted resource requests are allowed to be issued by the first computer;
receiving the second rule set;
if the first request is allowed according to the second rule set, sending the first request to the second computer; and
if the first request is not allowed according to the second rule set, blocking the first request.

13. The system of claim 12, where the one or more rules in at least one of the first rule set and the second rule set specify that one or more requests of the one or more intercepted resource requests are associated with the second computer.

14. The system of claim 12, wherein the executable code, when executed by the one or more processing devices, further causes the one or more processing devices to:
after receiving the second rule set, intercept a second request of the one or more intercepted resource requests;
check if fa) the second rule set contains one or more rules formulated to determine if the second request is allowed to be issued by the first computer;
if the second rule set contains the one or more of the rules formulated to determine if the second request is allowed to be issued by the first computer:
if the second request is allowed according to the second rule set, send the second request to the second computer without issuing a request for one or more rules from the third computer; and
if the second request is not allowed according to the second rule set, block the second request on the first computer; and
if the second rule set does not contain one or more rules associated with the second request:
hold the second request on the first computer,
send, by the first computer to the third computer, a request for a third rule set including one or more rules formulated to determine whether the second request, is allowed to be issued by the first computer;
receive the third rule set;
if the second request is allowed according to the third rule set, send the second request to the second computer; and
if the second request is not allowed according to the third rule set, block the second request.

15. The system of claim 14, wherein the first request is associated with a first access policy and the second request is associated with a second access policy different from the first access policy;
wherein the executable code, when executed by the one or more processing devices, further causes the one or more processing devices to:
after sending the request for the third rule set, receive a challenge requiring a user of the first computer to be authenticated according to the second access policy associated with the second request.

16. The system of claim 15, where access to one or more resources allowed according to the third rule set requires multi-factor user authentication, while access to one or more resources allowed according to the second rule set does not require multi-factor user authentication.

17. The system of claim 12, wherein the executable code, when executed by the one or more processing devices, further causes the one or more processing devices to:
after receiving the second rule set, intercept a second request;

check if the second rule set remains valid; and
if the second rule set is valid:
   if the second request is allowed according to the second rule set, send the second request to the second computer without issuing a request for one or more rules from the third computer; and
   if the second request is not allowed according to the second rule set, block the second request; and
if the second rule set is invalid:
   hold the second request;
   send, to the third computer, a request for a valid instance of the second rule set;
   receive the valid instance of the second rule set;
   if the second request is allowed according to the valid instance of the second rule set, send the second request to the second computer; and
   if the second request is not allowed according to the valid instance of the second rule set, block the second request.

18. The system of claim 17, where the second rule set is associated with an expiration time; and
   wherein the executable code, when executed by the one or more processing devices, further causes the one or more processing devices to check if the second request remain valid by checking that the second rule set has not expired before the second request was intercepted.

19. A system for managing access comprising:
   a first computer connected to a network and configured to control access to a protected resource, the first computer comprising one or more processing devices and one or more memory devices operably coupled to the one or more processing devices, the one or more memory devices storing executable code, that, when executed by the one or more processing devices, causes the one or more processing devices to:
   store a first rule set including one or more rules formulated to determine whether one or more incoming requests from a second computer can be allowed to proceed;
   receive a first request for a resource from the second computer;
   determine that the first request is blocked according to the first rule set;
   in response to determining that the first request is blocked according to the first rule set, preventing request allowance according to the first rule set;
   receive a second rule set including one or more rules formulated to determine whether the one or more incoming requests from the second computer can be allowed to proceed;
   evaluate whether a time of receipt of the second rule set is after a time one or after blocking of the first request;
   if the time of receipt of the second rule set is before the time on or after blocking of the first request, prevent request allowance according to the second rule set; and
   if the time of receipt of the second rule set is after the time on or after blocking of the first request, allow one or more subsequent requests that are allowable according to the second rule set.

20. The system of claim 19, wherein the executable code, when executed by the one or more processing devices, further causes the one or more processing devices to:
   derive the second rule set from a token received by the first computer, the token also containing a first value at least partially derived from a time when the token was issued; and
   if the first value indicates that the time when the token was issued is later than the time on or after blocking of the first request, determine that the token and the second rule set is valid.

21. The system of claim 19, wherein the executable code, when executed by the one or more processing devices, further causes the one or more processing devices to:
   allow the one or more subsequent requests from the first computer if allowable according to the second rule set and only if the one or more subsequent requests were received from a third computer, different from the first computer.

22. The system of claim 21, wherein the executable code, when executed by the one or more processing devices, further causes the one or more processing devices to:
   before receiving the second set, send a message to the third computer, indicating that the first request was blocked.

23. The system of claim 19, wherein the executable code, when executed by the one or more processing devices, further causes the one or more processing devices to:
   derive the second rule set from a token received by the first computer; and
   only if the token was cryptographically signed by a trusted entity after the first request was blocked, allow one or more subsequent requests from the second computer.

24. The system of claim 19, wherein the executable code, when executed by the one or more processing devices, further causes the one or more processing devices to receive the second rule set from the second computer.

25. The system of claim 24, further comprising a third computer;
   wherein the third computer is configured to generate the second rule set in response to a request from the second computer and transmit the second rule set to the second computer.

* * * * *